(12) United States Patent
Kawamura et al.

(10) Patent No.: US 12,331,821 B2
(45) Date of Patent: Jun. 17, 2025

(54) GEAR AND STEERING DEVICE

(71) Applicants: JTEKT CORPORATION, Kariya (JP);
JTEKT COLUMN SYSTEMS CORPORATION, Kosai (JP)

(72) Inventors: Naofumi Kawamura, Kishiwada (JP);
Hiroaki Suzuki, Toyota (JP); Tetsuya Ebisu, Shijonawate (JP); Yuki Fujioka, Kashiba (JP); Tomonori Sugiura, Yamatokoriyama (JP); Kosuke Ito, Shiki-gun (JP); Yasuhiro Tanioka, Kashihara (JP); Masayoshi Sakuda, Kashihara (JP); Takahiro Baito, Kosai (JP); Takao Nakaaki, Kashihara (JP); Yoshiaki Murakami, Hamamatsu (JP); Takashi Yamaguchi, Toyohashi (JP); Kazuhisa Asakawa, Shiki-gun (JP)

(73) Assignee: JTEKT CORPORATION, Kariya (JP)

( * ) Notice: Subject to any disclaimer, the term of this patent is extended or adjusted under 35 U.S.C. 154(b) by 0 days.

(21) Appl. No.: 18/569,517

(22) PCT Filed: Mar. 10, 2022

(86) PCT No.: PCT/JP2022/010695
§ 371 (c)(1),
(2) Date: Dec. 12, 2023

(87) PCT Pub. No.: WO2022/264559
PCT Pub. Date: Dec. 22, 2022

(65) Prior Publication Data
US 2024/0271689 A1    Aug. 15, 2024

(30) Foreign Application Priority Data

Jun. 17, 2021 (WO) .................. PCT/JP2021/023087

(51) Int. Cl.
*F16H 55/12* (2006.01)
*B62D 5/04* (2006.01)
*F16H 55/06* (2006.01)

(52) U.S. Cl.
CPC .......... *F16H 55/12* (2013.01); *B62D 5/0403* (2013.01); *F16H 2055/065* (2013.01)

(58) Field of Classification Search
CPC .. F16H 55/12; F16H 2055/065; B62D 5/0403
(Continued)

(56) References Cited

U.S. PATENT DOCUMENTS

| | | | |
|---|---|---|---|
| 4,633,556 A | | 1/1987 | Santi |
| 5,852,951 A | * | 12/1998 | Santi ...................... F16H 55/06 |
| | | | 74/DIG. 10 |

(Continued)

FOREIGN PATENT DOCUMENTS

| | | |
|---|---|---|
| CN | 205155081 U | 4/2016 |
| JP | S63-26531 A | 2/1988 |

(Continued)

OTHER PUBLICATIONS

Jul. 16, 2024 Extended Search Report issued in European Patent Application No. 22822851.6.

(Continued)

*Primary Examiner* — William C Joyce
(74) *Attorney, Agent, or Firm* — Oliff PLC

(57) ABSTRACT

A gear includes an annular sleeve and a tooth portion provided by injection molding to cover a part of the sleeve. The sleeve is a stacked body including a plurality of annular steel plates stacked in an axial direction of the sleeve.

14 Claims, 10 Drawing Sheets

(58) Field of Classification Search
USPC .................................................. 74/DIG. 10
See application file for complete search history.

(56) References Cited

U.S. PATENT DOCUMENTS

2008/0146402 A1  6/2008  Shinohara
2018/0017149 A1  1/2018  Takeuchi et al.

FOREIGN PATENT DOCUMENTS

| | | |
|---|---|---|
| JP | 3084778 U | 3/2002 |
| JP | 2002-139131 A | 5/2002 |
| JP | 2009-222149 A | 10/2009 |
| JP | 2011-127722 A | 6/2011 |
| JP | 2014-222107 A | 11/2014 |
| JP | 2015-082911 A | 4/2015 |
| JP | 2018-009657 A | 1/2018 |
| JP | 2018-204660 A | 12/2018 |

OTHER PUBLICATIONS

May 17, 2022 International Search Report issued in International Patent Application No. PCT/JP2022/010695.

\* cited by examiner

GEAR AND STEERING DEVICE

TECHNICAL FIELD

The present disclosure relates to a gear and a steering device.

BACKGROUND ART

For example, a speed reducer described in Patent Document 1 is used when transmitting a rotational force of a motor. The speed reducer described in Patent Document 1 includes a pinion shaft and a reduction gear. The pinion shaft is connected to a rotation shaft of the motor. The reduction gear is fitted to an output shaft and meshes with the pinion shaft. The output shaft is connected to a steering shaft of a steering device. The reduction gear includes a primary gear and a secondary gear. The primary gear is made of a material containing iron or the like. The secondary gear includes a metal core and a synthetic resin member. The metal core is made of a material containing iron or the like into an annular shape. The synthetic resin member is made of a synthetic resin into an annular shape. The synthetic resin member is fixed to the outer periphery of the metal core.

RELATED ART DOCUMENTS

Patent Documents

Patent Document 1: Japanese Unexamined Patent Application Publication No. 2009-222149 (JP 2009-222149 A)

SUMMARY OF THE INVENTION

Problem to be Solved by the Invention

To reduce the weight of the metal core described in Patent Document 1, it is necessary to perform a weight reduction process for the metal core, for example, by hollowing out or shaving a part of the metal core. However, there is a limit to the degree of weight reduction when the weight reduction process is performed on the metal core. This is because the capacity of equipment to be used for the weight reduction process and the processing method are limited.

Means for Solving the Problem

A gear according to an aspect of the present disclosure includes an annular sleeve and an annular tooth portion provided by injection molding to cover a part of the sleeve. The sleeve is a stacked body including a plurality of annular steel plates stacked in an axial direction of the sleeve.

A steering device according to an aspect of the present disclosure includes a steering shaft to which a steering wheel of a vehicle is connected, a steering operation shaft configured to operate to turn a steered wheel of the vehicle, a motor, and a speed reducing mechanism including the gear described above. The speed reducing mechanism connects the motor to the steering shaft or the steering operation shaft.

MODES FOR CARRYING OUT THE INVENTION

First Embodiment

A first embodiment will be described below with reference to FIGS. 1 to 8.

Figure 1:
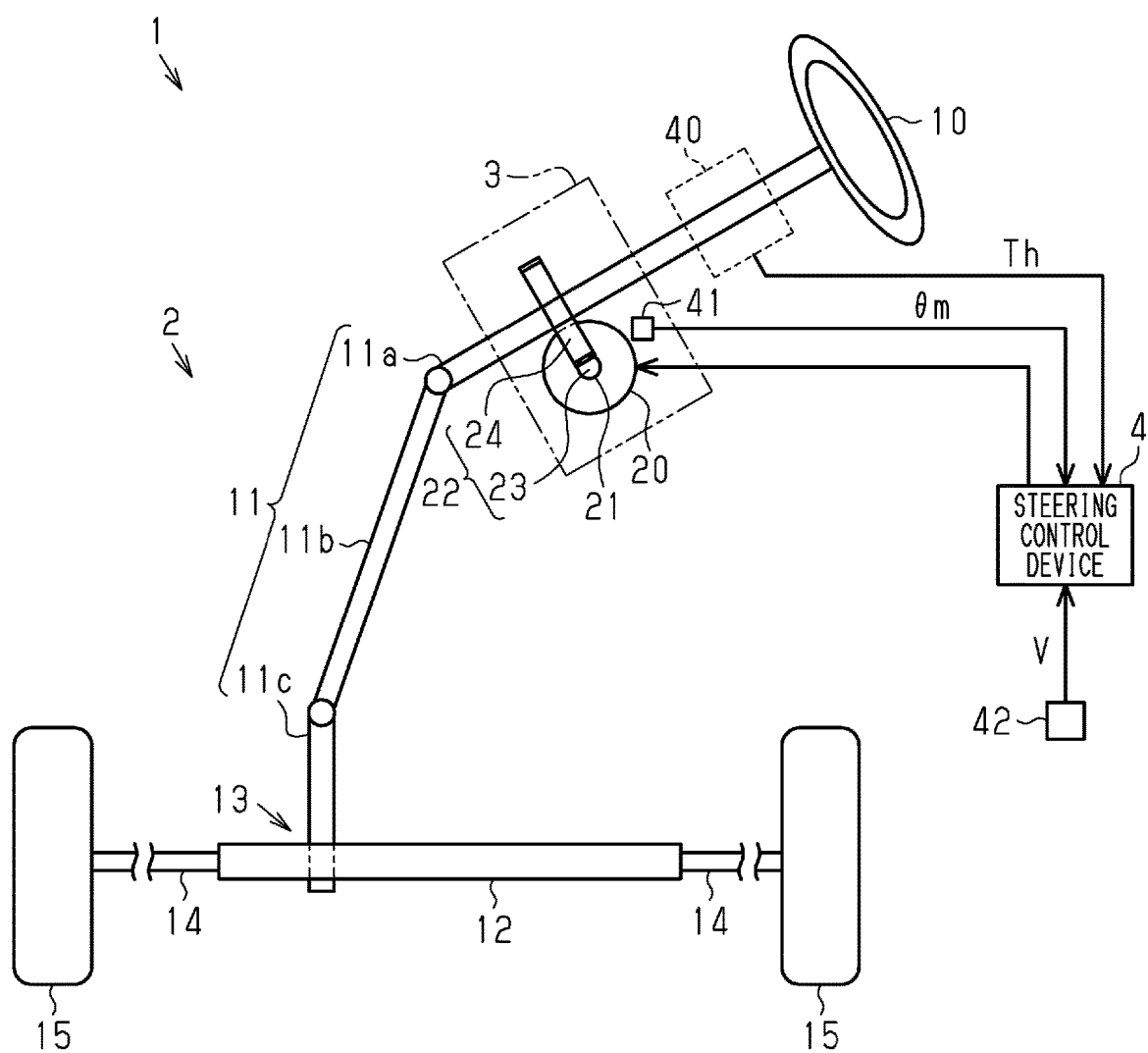
FIG. 1 is a schematic diagram of a steering device.

As shown in FIG. 1, a vehicle includes a steering device 1. The steering device 1 includes a steering mechanism 2, an actuator 3, and a steering control device 4. The steering mechanism 2 turns steered wheels 15 of the vehicle based on a steering operation that is an operation performed by a driver on a steering wheel 10 of the vehicle. The actuator 3 applies a motor torque to the steering mechanism 2. The motor torque is an assisting force for assisting the steering operation and a turning force for turning the steered wheels 15. In other words, the steering device 1 is an electric power steering system that assists the steering operation. The steering control device 4 controls the operation of the actuator 3.

<Structure of Steering Mechanism>

The steering mechanism 2 includes a steering shaft 11, a rack shaft 12, and a rack and pinion mechanism 13.

The steering shaft 11 includes a column shaft 11a, an intermediate shaft 11b, and a pinion shaft 11c. A first end of the column shaft 11a is connected to the steering wheel 10 of the vehicle. A second end of the column shaft 11a is connected to a first end of the intermediate shaft 11b. A second end of the intermediate shaft 11b is connected to a first end of the pinion shaft 11c. A second end of the pinion shaft 11c is connected to the rack shaft 12. The pinion shaft 11c and the rack shaft 12 are connected via the rack and pinion mechanism 13. Both ends of the rack shaft 12 are connected to the right and left steered wheels 15 of the vehicle via tie rods 14. The rack and pinion mechanism 13 is structured by meshing rack teeth (not shown) provided on the rack shaft 12 and pinion teeth (not shown) provided on the pinion shaft 11c. In the present embodiment, the rack shaft 12 is an example of a steering operation shaft.

Therefore, the steering shaft 11 rotates in conjunction with the rotation of the steering wheel 10. The rotation of the steering shaft 11 is converted into axial reciprocating motion of the rack shaft 12 via the rack and pinion mechanism 13. The reciprocating motion is transmitted to the right and left steered wheels 15 via the tie rods 14, thereby changing the steered angles of the steered wheels 15.

<Actuator Structure>

The actuator 3 includes a motor 20 and a speed reducing mechanism 22. The motor 20 includes an output shaft 21 that outputs a motor torque that is a rotational force. The motor 20 is, for example, a three-phase brushless motor.

The speed reducing mechanism 22 includes a worm shaft 23 and a worm wheel 24. The worm shaft 23 is connected to the tip of the output shaft 21 of the motor 20. The worm wheel 24 meshes with a worm provided on the worm shaft 23. The worm wheel 24 is fitted to the column shaft 11a. The worm wheel 24 is connected to the column shaft 11a to rotate together.

The motor torque of the motor 20 is transmitted to the column shaft 11a via the worm shaft 23 and the worm wheel 24, that is, the speed reducing mechanism 22. The transmitted motor torque rotates the steering shaft 11. That is, the motor torque of the motor 20 is converted into a force for rotating the steering shaft 11 and reciprocating the rack shaft 12 in the axial direction. The reciprocating force serves as an assisting force for assisting the steering operation.

<Structure of Steering Control Device>

The steering control device 4 is connected to the motor 20. The steering control device 4 controls the operation of the motor 20. The steering control device 4 includes, for example, a central processing unit (CPU) and a memory (not shown). The CPU executes a program stored in the memory at predetermined calculation cycles. In this way, various types of control are executed.

Various sensors provided in the vehicle are connected to the steering control device 4. The steering control device 4 controls supply of a current that is a control amount for the motor 20 based on detection results from the various sensors. Therefore, the steering control device 4 controls the operation of the motor 20. The various sensors include, for example, a torque sensor 40, a rotation angle sensor 41, and a vehicle speed sensor 42. The torque sensor 40 is provided on the column shaft 11a. The torque sensor 40 detects a steering torque Th applied to the steering shaft 11 by the steering operation. The rotation angle sensor 41 is provided on the motor 20. The rotation angle sensor 41 detects a rotation angle θm of the output shaft 21 of the motor 20. The vehicle speed sensor 42 detects a vehicle speed V that is a travel speed of the vehicle.

<Structure of Worm Wheel>

Figure 2:
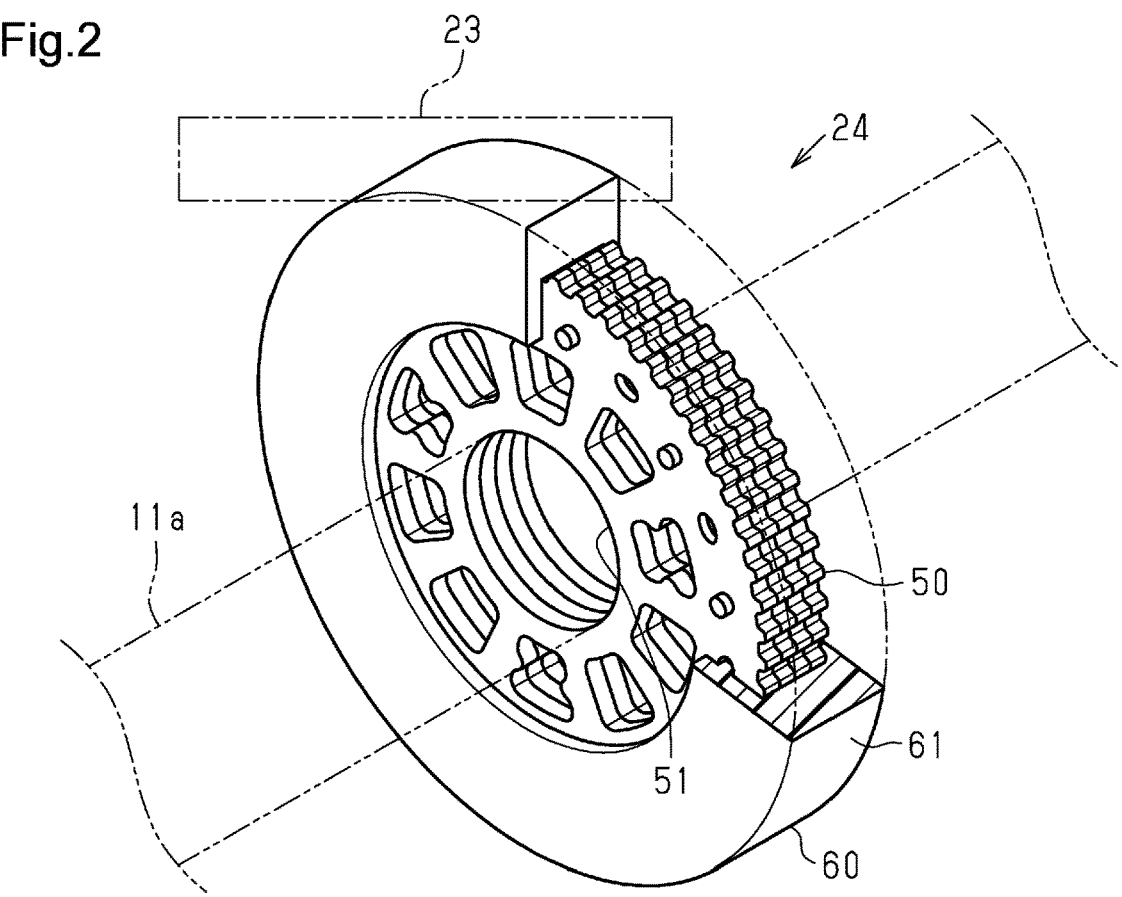
FIG. 2 is a perspective view of a worm wheel according to a first embodiment.

As shown in FIG. 2, the worm wheel 24 includes a sleeve 50 and a tooth portion 60. In the present embodiment, the worm wheel 24 is an example of a gear.

A metal material such as steel is used for the sleeve 50. The shape of the sleeve 50 is cylindrical or annular. The sleeve 50 has a shaft hole 51 axially passing through a central portion in a radial direction. The column shaft 11a is inserted into the shaft hole 51 as indicated by long dashed double-short dashed lines in FIG. 2. The sleeve 50 is connected to the column shaft 11a to rotate together.

A polymer material such as a synthetic resin is used as the material of the tooth portion 60. The shape of the tooth portion 60 is cylindrical or annular. The tooth portion 60 is formed by injection molding to cover a part of the sleeve 50. The tooth portion 60 covers an outer peripheral portion of the sleeve 50. The tooth portion 60 partially covers the sleeve 50 from both sides in the axial direction and covers the sleeve 50 from the outside in the radial direction. The tooth portion 60 is integrated with the sleeve 50. The tooth portion 60 has tooth surfaces 61 on its outer peripheral surface. As indicated by long dashed double-short dashed lines in FIG. 2, the tooth surfaces 61 are surfaces that mesh with a worm provided on the worm shaft 23.

<Sleeve Structure>

Figure 3:
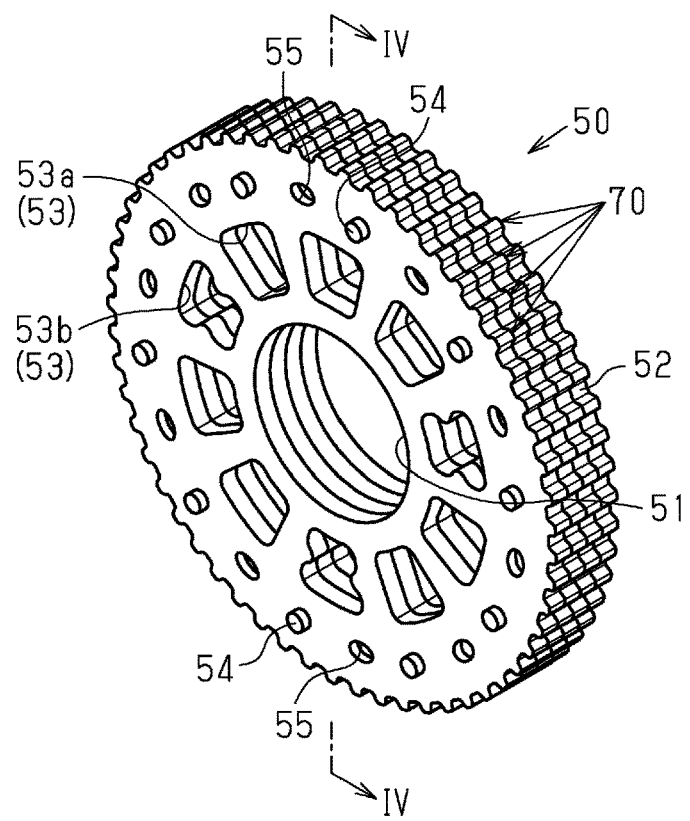
FIG. 3 is a perspective view of a sleeve of the worm wheel of FIG. 2.
Figure 4:
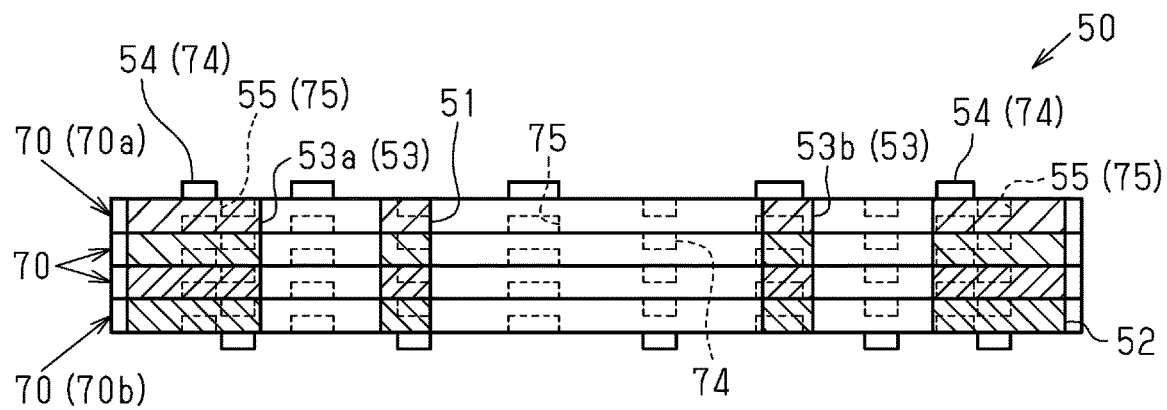
FIG. 4 is a sectional view taken along a line IV-IV of FIG. 3.

As shown in FIGS. 3 and 4, the sleeve 50 includes a plurality of plates 70. In the present embodiment, the number of plates 70 is four. The number of plates 70 can be changed as appropriate, as typified by less than four or five or more, as long as the number is plural. The plate 70 is plate-like steel, a so-called steel plate. The plate 70 is manufactured by punching out the steel plate into an annular shape, for example, by a process such as pressing. The plates 70 are stacked in the axial direction of the sleeve 50. The sleeve 50 is a stacked body including the plurality of plates 70 stacked together. The axial direction of each plate 70 agrees with the axial direction of the sleeve 50. The thickness direction of each plate 70 agrees with the axial direction of the sleeve 50.

<Regarding Grooves>

The sleeve 50 has a plurality of grooves 52 on its outer peripheral surface. In the present embodiment, the number of grooves 52 is larger than, for example, the number of grooves provided to the tooth surfaces 61 of the tooth portion 60. The number of grooves 52 can be changed as appropriate, as typified by a number equal to or smaller than the number of grooves provided to the tooth surfaces 61 of the tooth portion 60. The groove 52 extends straight in the axial direction of the sleeve 50. The grooves 52 are positioned at predetermined intervals, for example, at equal intervals in the circumferential direction of the sleeve 50. A portion of the sleeve 50 where the groove 52 is provided is a portion covered with the tooth portion 60. The sleeve 50 is coupled to an inner peripheral portion of the tooth portion 60 by the grooves 52. In the present embodiment, the groove 52 is an example of a coupling portion.

<Regarding Lightening Holes>

The sleeve 50 has a plurality of lightening holes 53 positioned around the shaft hole 51. In the present embodiment, the number of lightening holes 53 is ten. The number of lightening holes 53 can be changed as appropriate, as typified by less than 10 or 11 or more. The lightening hole 53 axially passes through the sleeve 50. Each lightening hole 53 extends straight in the axial direction of the sleeve 50. The lightening holes 53 are positioned at predetermined intervals, for example, at equal intervals in the circumferential direction of the sleeve 50. A portion of the sleeve 50 where the lightening hole 53 is provided is a portion uncovered with the tooth portion 60. The lightening holes 53 are provided for the purpose of reducing the weight of the sleeve 50. The weight of the sleeve 50 is reduced depending on the number of lightening holes 53.

The lightening holes 53 include a first lightening hole 53a and a second lightening hole 53b. The first lightening hole 53a and the second lightening hole 53b have different shapes when viewed in the axial direction of the sleeve 50. The first lightening hole 53a has a trapezoidal shape when viewed in the axial direction of the sleeve 50. The dimension of the first lightening hole 53a in the circumferential direction of the sleeve 50 gradually increases toward the radially outer side of the sleeve 50. The shape of the second lightening hole 53b is such that, when viewed in the axial direction of the sleeve 50, a pair of non-parallel trapezoidal pieces is deformed to approach each other at an intermediate portion of the second lightening hole 53b in the radial direction of the sleeve 50. In other words, the shape of the second lightening hole 53b differs from the shape of the first lightening hole 53a in that the dimension of the second lightening hole 53b in the circumferential direction of the sleeve 50 is smaller at the intermediate portion in the radial direction than at the other portions. The shape of the first lightening hole 53a and the shape of the second lightening hole 53b can be changed as appropriate as long as they differ from each other.

In the present embodiment, seven out of the ten lightening holes 53 are the first lightening holes 53a, and three out of the ten lightening holes 53 are the second lightening holes 53b. The second lightening holes 53b are positioned at first, second, and third locations in the circumferential direction of the sleeve 50. Three first lightening holes 53a are positioned between the first location and the second location. Two first lightening holes 53a are positioned between the first location and the third location, and two first lightening holes 53a are positioned between the second location and the third location. Therefore, the ten lightening holes 53 are in different states at any phase positions during one rotation of the sleeve 50. Thus, the circumferential phase of the sleeve 50 is uniquely determined.

<Regarding Protrusions and Recesses>

The sleeve 50 has a plurality of protrusions 54 and a plurality of recesses 55 at portions on the radially outer side of the lightening holes 53. The protrusions 54 and the recesses 55 are provided on both axial surfaces of the sleeve 50. In the present embodiment, the number of protrusions 54 is ten on each of the two axial surfaces of the sleeve 50. The number of recesses 55 is also ten on each of the two axial surfaces of the sleeve 50. That is, the numbers of protrusions 54 are the same on both the axial surfaces of the sleeve 50, and the numbers of recesses 55 are the same on both the axial surfaces of the sleeve 50. Further, the number of protrusions 54 and the number of recesses 55 are the same on each of the two axial surfaces of the sleeve 50. The number of protrusions 54 and the number of recesses 55 can be changed as appropriate, as typified by less than 10 or 11 or more.

The protrusion 54 protrudes in the axial direction from one surface of the sleeve 50 in the axial direction. The shape of the protrusion 54 is columnar. The protruding length of the protrusion 54, that is, the length of the column is smaller than the thickness of one plate 70. The recess 55 has a depth in the axial direction from one surface of the sleeve 50 in the axial direction. The shape of the recess 55 is an elliptical shape having a major axis in the circumferential direction of the sleeve 50 when viewed in the axial direction of the sleeve 50. The depth of the recess 55 is substantially the same as the protruding length of the protrusion 54. That is, the depth of the recess 55 is smaller than the thickness of one plate 70. The diameter of the protrusion 54 having the circular sectional shape is slightly larger than the diameter of the minor axis of the recess 55 having the elliptical sectional shape, and is smaller than the diameter of the major axis of the recess 55.

On each of the two surfaces of the sleeve 50, the protrusions 54 and the recesses 55 are alternately disposed at predetermined intervals, for example, at equal intervals in the circumferential direction of the sleeve 50. On each of the two surfaces of the sleeve 50, one protrusion 54 and one recess 55 are disposed at positions corresponding to both radially outer corners of each lightening hole 53. The portions of the sleeve 50 where the protrusions 54 and the recesses 55 are provided are portions covered with the tooth portion 60. The sleeve 50 is coupled to the inner peripheral portion of the tooth portion 60 by the protrusions 54 and the recesses 55.

<Plate Structure>

Figure 5:
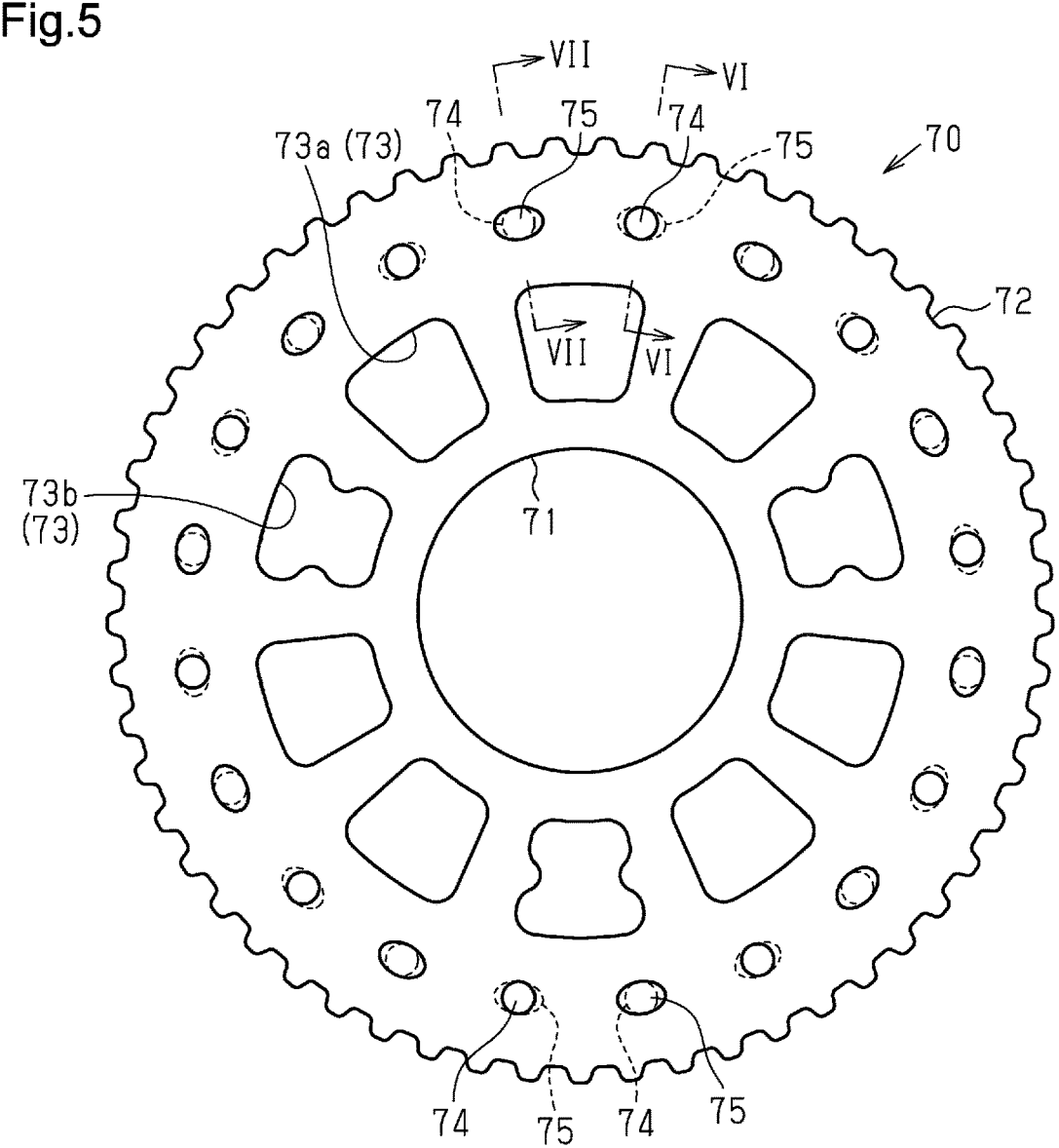
FIG. 5 is a front view showing one plate constituting the sleeve of FIG. 3.

FIG. 5 shows one plate 70. In the present embodiment, the four plates 70 constituting the sleeve 50 have the same structure. The plate 70 has an annular shape and has a plate shaft hole 71 at a central portion in the radial direction. The plate shaft hole 71 has a circular shape and passes through the central portion of the plate 70 in the axial direction. The plate shaft hole 71 is formed by punching out a corresponding portion of the steel plate by a process such as pressing when the plate 70 is manufactured. The method for forming the plate shaft hole 71 can be changed as appropriate, as typified by forming the plate shaft hole 71 by cutting a steel plate that has been punched into an annular shape by a process such as pressing.

<Regarding Plate Grooves>

The plate 70 has a plurality of plate grooves 72 that is steel plate grooves on its outer peripheral surface. In the present embodiment, the number of plate grooves 72 is the same as the number of grooves 52 in the sleeve 50. The plate groove 72 extends straight in the thickness direction of the plate 70. The plate grooves 72 are provided at predetermined intervals, for example, at equal intervals in the circumferential direction of the plate 70. A portion of the plate 70 where the plate groove 72 is provided is a portion covered with the tooth portion 60. The plate groove 72 is formed by punching out a corresponding portion of the steel plate by a process such as pressing when the plate 70 is manufactured. The method for forming the plate groove 72 can be changed as appropriate, as typified by forming the plate groove 72 by cutting a steel plate that has been punched into an annular shape by a process such as pressing. In the present embodiment, each plate groove 72 is an example of a coupling formation portion.

<Regarding Lightening Through Holes>

The plate 70 has a plurality of lightening through holes 73 positioned around the plate shaft hole 71. In the present embodiment, the number of lightening through holes 73 is the same as the number of lightening holes 53 of the sleeve 50. Each lightening through hole 73 passes through the plate 70 in the thickness direction. The lightening through holes 73 are positioned at predetermined intervals, for example, at equal intervals in the circumferential direction of the plate 70. A portion of the plate 70 where the lightening through hole 73 is provided is a portion uncovered with the tooth portion 60.

The lightening through holes 73 include a first lightening through hole 73a and a second lightening through hole 73b. The first lightening through hole 73a and the second lightening through hole 73b have different shapes when viewed in the thickness direction of the plate 70. The shape of the first lightening through hole 73a is the same as the shape of the first lightening hole 53a of the sleeve 50. The shape of the second lightening through hole 73b is the same as the shape of the second lightening hole 53b of the sleeve 50. The lightening through hole 73 is formed by punching out a corresponding portion of the steel plate by a process such as pressing when the plate 70 is manufactured. The method for forming the lightening through hole 73 can be changed as appropriate, as typified by forming the lightening through hole 73 by cutting a steel plate that has been punched into an annular shape by a process such as pressing.

In the present embodiment, seven out of the ten lightening through holes 73 are the first lightening through holes 73a, and three out of the ten lightening through holes 73 are the second lightening through holes 73b similarly to the lightening holes 53 of the sleeve 50. The second lightening through holes 73b are positioned at first, second, and third locations in the circumferential direction of the plate 70. Three first lightening through holes 73a are positioned between the first location and the second location. Two first lightening through holes 73a are positioned between the first location and the third location, and two first lightening through holes 73a are positioned between the second location and the third location. Thus, the circumferential phase of the plate 70 is uniquely determined.

<Regarding Plate Protrusions and Plate Recesses>

The plate 70 has a plurality of plate protrusions 74 that are steel plate protrusions and a plurality of plate recesses 75 that are steel plate recesses at portions on the radially outer side of the lightening through holes 73. The plate protrusions 74 and the plate recesses 75 are provided on both surfaces of the plate 70 in the thickness direction. In the present embodiment, the number of plate protrusions 74 on each surface of the plate 70 is the same as the number of protrusions 54 on each surface of the sleeve 50. The number of plate recesses 75 on each surface of the plate 70 is the same as the number of recesses 55 on each surface of the sleeve 50. That is, the numbers of plate protrusions 74 are the same on both the surfaces of the plate 70, and the numbers of plate recesses 75 are the same on both the surfaces of the plate 70. Further, the number of plate protrusions 74 and the number of plate recesses 75 are the same on each of the two surfaces of the plate 70. The portions of the plate 70 where the plate protrusions 74 and the plate recesses 75 are provided are portions covered with the tooth portion 60.

The plate protrusion 74 protrudes in the axial direction from one surface of the plate 70 in the axial direction. The shape of the plate protrusion 74 is the same as the shape of the protrusion 54. The protruding length of the plate protrusion 74, that is, the length of the column is smaller than the thickness of one plate 70. The shape of the plate recess 75 is the same as the shape of the recess 55. The depth of the plate recess 75 is substantially the same as the protruding length of the plate protrusion 74. The depth of the plate recess 75 is smaller than the thickness of one plate 70. The diameter of the plate protrusion 74 having the circular sectional shape is slightly larger than the diameter of the minor axis of the plate recess 75 having the elliptical sectional shape, and is smaller than the diameter of the major axis of the plate recess 75 similarly to the relationship between the protrusion 54 and the recess 55. The plate protrusion 74 of the plate 70 can be press-fitted to the plate recess 75 of another plate 70. The plate protrusion 74 is formed by pushing the corresponding portion of the steel plate into a mold to protrude by a process such as pressing when the plate 70 is manufactured. The plate recess 75 is formed by pushing the mold into the corresponding portion of the steel plate by a process such as pressing when the plate 70 is manufactured.

The plate protrusions 74 and the plate recesses 75 are alternately disposed at predetermined intervals, for example, at equal intervals in the circumferential direction of the plate 70. One plate protrusion 74 and one plate recess 75 are disposed at positions corresponding to both radially outer corners of each lightening through hole 73.

Figure 6:
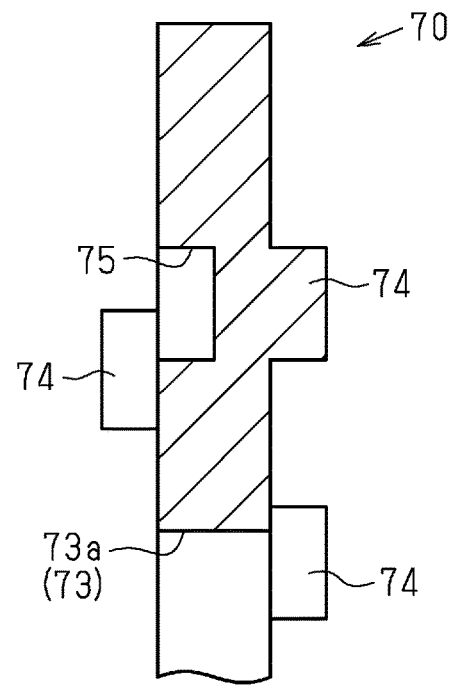
FIG. 6 is a sectional view taken along a line VI-VI of FIG. 5.
Figure 7:
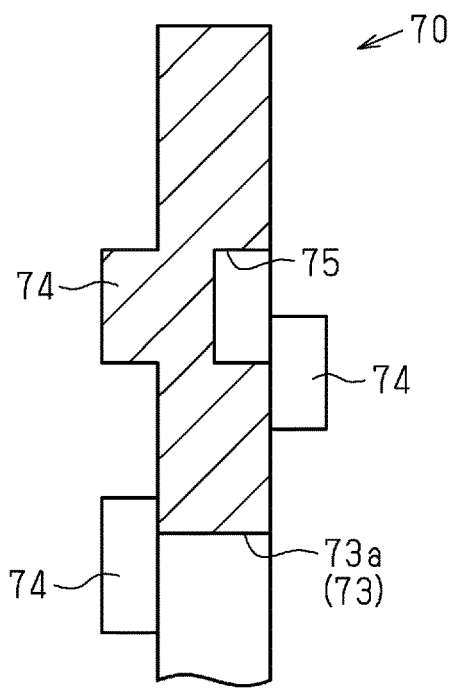
FIG. 7 is a sectional view taken along a line VII-VII of FIG. 5.

As shown in FIGS. 6 and 7, each of the plate protrusions 74 on one surface of the plate 70 is disposed to mate with one of the plate recesses 75 on the other surface of the plate 70 in the circumferential and radial directions of the plate 70. That is, as shown in FIG. 5, each of the plate protrusions 74 on one surface of the plate 70 is disposed to overlap one of the plate recesses 75 on the other surface of the plate 70 when viewed in the thickness direction of the plate 70. Similarly, each of the plate recesses 75 on one surface of the plate 70 is disposed to overlap one of the plate protrusions 74 on the other surface of the plate 70 when viewed in the thickness direction of the plate 70.

<Regarding Stacking of Plates>

The plate 70 has a first surface and a second surface oriented in opposite directions in the thickness direction. For example, the surface on the front side of the drawing sheet of FIG. 5 is the first surface of the plate 70, and the surface on the back side of the drawing sheet of FIG. 5 is the second surface of the plate 70. A plurality of plates 70 is stacked in the thickness direction with the first surfaces of all the plates 70 oriented in the same direction, that is, with the first surface of each plate 70 facing the second surface of the adjacent plate 70. The plurality of plates 70 is stacked in the thickness direction with the shapes of the lightening through holes 73 agreeing with each other when viewed in the thickness direction.

Therefore, the relative circumferential phases of all the plates 70 are uniquely determined. That is, the positions of the plate shaft holes 71 of all the plates 70 agree with each other when viewed in the thickness direction. The positions of the plate grooves 72 of all the plates 70 agree with each other when viewed in the thickness direction. The positions and shapes of the lightening through holes 73 of all the plates 70 agree with each other when viewed in the thickness direction. Specifically, the positions of the first lightening through holes 73a of all the plates 70 agree with each other when viewed in the thickness direction, and the positions of the second lightening through holes 73b of all the plates 70 agree with each other when viewed in the thickness direction. Further, the positions of the plate protrusions 74 and the plate recesses 75 of all the plates 70 agree with each other when viewed in the thickness direction. In two adjacent plates 70, each of the plate protrusions 74 of one plate 70 faces one of the plate recesses 75 of the other plate 70 in the thickness direction.

Figure 8:
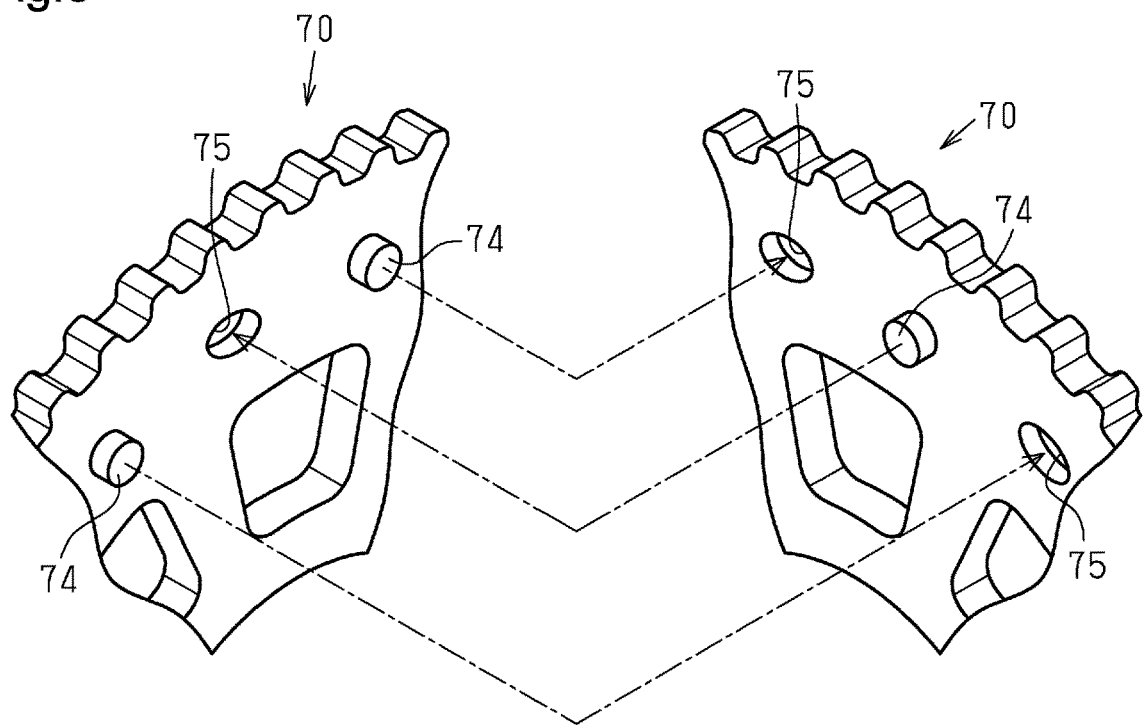
FIG. 8 is a schematic diagram showing a fitting structure between the plates constituting the sleeve of FIG. 3.

As shown in FIG. 8, in the two adjacent plates 70, each of the plate protrusions 74 of one plate 70 is fitted, specifically, press-fitted to one of the plate recesses 75 of the other plate 70. The adjacent plates 70 are integrated with each other by fitting the plate protrusions 74 and the plate recesses 75. As a result, the sleeve 50 that is the stacked body in which the plurality of plates 70 is stacked in the thickness direction is completed.

As shown in FIGS. 3 and 4, the plate shaft holes 71 of the plurality of stacked plates 70 form the shaft hole 51 of the sleeve 50 by being arranged in the thickness direction. The plate grooves 72 of the plurality of stacked plates 70 form the grooves 52 of the sleeve 50 by being arranged in the thickness direction. The lightening through holes 73 of the plurality of stacked plates 70 form the lightening holes 53 of the sleeve 50 by being arranged in the thickness direction. In particular, the first lightening through holes 73a of the plurality of stacked plates 70 form the first lightening holes 53a of the sleeve 50 by being arranged in the thickness direction. The second lightening through holes 73b of the plurality of stacked plates 70 form the second lightening holes 53b of the sleeve 50 by being arranged in the thickness direction.

As indicated by dashed lines in FIG. 4, the plate protrusions 74 and the plate recesses 75 of the adjacent plates 70 that are fitted to each other are embedded inside the sleeve 50 and are not exposed to the outside. As shown in FIG. 4, the plate protrusions 74 and the plate recesses 75 positioned on both the axial surfaces of the sleeve 50 are not fitted to other plate protrusions 74 or plate recesses 75, but form the protrusions 54 and the recesses 55 of the sleeve 50 by being exposed to the outside of the sleeve 50. The plate protrusions 74 and the plate recesses 75 that form the protrusions 54 and the recesses 55 of the sleeve 50 are provided on the first surface or the second surface of two plates 70a, 70b disposed at both axial ends of the sleeve 50.

<Actions of Present Embodiment>

According to the present embodiment, the weight of the sleeve 50 is reduced by the amount corresponding to the lightening holes 53. The lightening holes 53 are formed by arranging the lightening through holes 73 of the plurality of stacked plates 70 in the thickness direction. The weight reduction of the sleeve 50 can be achieved by processing each plate 70 to form the lightening through holes 73 in the process before the plates 70 are stacked.

When the sleeve 50 is structured by the stacked body of the plurality of plates 70 as in the present embodiment, the weight reduction of the sleeve 50 can be achieved by processing each plate 70 to form the lightening through holes 73 when each plate 70 is manufactured. When the lightening through holes 73 are formed by processing each plate 70 before the stacking in this way, the weight of the sleeve 50 that is the stacked body can be reduced more easily than in a case where the lightening holes 53 are formed by processing the sleeve 50. This is because the capacity of equipment to be used for the weight reduction process can be reduced and the method for the weight reduction process can be facilitated.

<Effects of First Embodiment>

(1-1) When each plate 70 before the stacking is subjected to the weight reduction process, the capacity of the equipment to be used for the weight reduction process can be reduced and the method for the weight reduction process can be facilitated compared to the case where the sleeve 50 that is the stacked body is subjected to the weight reduction process. That is, it is possible to relax the limitations on the capacity of the equipment for the weight reduction process and the processing method by structuring the sleeve 50 as the stacked body of the plurality of plates 70. Therefore, the limit to the degree of weight reduction can be raised about the weight reduction process for the sleeve 50.

(1-2) The sleeve 50 has the grooves 52 at the portions covered with the tooth portion 60. The sleeve 50 is coupled to the inner peripheral portion of the tooth portion 60 by the grooves 52. Relative movement in the circumferential direction between the sleeve 50 and the tooth portion 60 is suppressed by the grooves 52. Therefore, the strength of the coupling between the sleeve 50 and the tooth portion 60 can be increased.

(1-3) The weight reduction of the sleeve 50 is achieved by the lightening holes 53. That is, the weight reduction of the sleeve 50 is achieved by the lightening through holes 73 of the plurality of stacked plates 70. The capacity of the equipment required in the weight reduction process for the sleeve 50 may be a capacity of the equipment to punch the lightening through holes 73 by a process such as pressing when the plate 70 is manufactured.

(1-4) The lightening holes 53 include the first lightening hole 53a and the second lightening hole 53b having different shapes when viewed in the axial direction of the sleeve 50. The lightening through holes 73 include the first lightening through hole 73a and the second lightening through hole 73b having different shapes when viewed in the thickness direction of the plate 70. Accordingly, when the plurality of plates 70 is stacked, the circumferential phases can agree with each other among the plurality of plates 70. This is effective in centering the shaft hole 51, the grooves 52, the lightening holes 53, the protrusions 54, and the recesses 55 in the sleeve 50.

(1-5) When the plate shaft hole 71, the plate grooves 72, and the lightening through holes 73 are punched by a process such as pressing, the plate 70 has burrs. Such burrs are similar in size and shape at the same portions of the plates 70 in the case of the same processing equipment. In a state in which the plurality of plates 70 is stacked, the portions having burrs similar in size and shape are adjacent to each other when the circumferential phases agree with each other among the plates 70. In this case, the clearance between the plates 70 can be reduced compared to a case where portions having burrs that are not similar in size and shape are adjacent to each other. Therefore, it is possible to appropriately achieve the centering of the shaft hole 51, the grooves 52, the lightening holes 53, the protrusions 54, and the recesses 55 in the sleeve 50.

(1-6) In adjacent plates 70, the plate protrusion 74 is press-fitted to the plate recess 75. Relative movement in the circumferential direction between the adjacent plates 70 is suppressed by the fitting between the plate protrusion 74 and the plate recess 75. The same applies to relative movement in the thickness direction between the adjacent plates 70. Therefore, the strength of the fitting between the adjacent plates 70 can be increased.

(1-7) The portions of the plate 70 where the plate protrusions 74 and the plate recesses 75 are provided are portions covered with the tooth portion 60. Some of the plate protrusions 74 and the plate recesses 75 form the protrusions 54 and the recesses 55 that are coupled to the inner peripheral portion of the tooth portion 60. Relative movement in the circumferential direction between the sleeve 50 and the tooth portion 60 is suppressed by the protrusions 54 and the recesses 55. Therefore, the strength of the coupling between the sleeve 50 and the tooth portion 60 can be increased.

(1-8) The protrusions 54 and the recesses 55 suppress deformation of the tooth portion 60 due to an axial load, that is, so-called excess inclination. Some of the plate protrusions 74 and the plate recesses 75 that form the protrusions 54 and the recesses 55 have an effect of increasing the strength of the coupling between adjacent plates 70 and an effect of increasing the strength of the coupling between the sleeve 50 and the tooth portion 60. In addition, some of the plate protrusions 74 and the plate recesses 75 that form the protrusions 54 and the recesses 55 have an effect of increasing the strength of the tooth portion 60 against the axial load. In this case, the structure of the plate 70 can be simplified compared to a case of individually forming structures having the various effects. This is effective in reducing the capacity of the equipment to be used for the process when manufacturing the plate 70 and in facilitating the processing method.

(1-9) In the present embodiment, it is possible to achieve the steering device 1 that can raise the limit to the degree of weight reduction in the weight reduction process by forming the sleeve 50 as the stacked body of the plurality of plates 70.

Second Embodiment

Next, a second embodiment will be described with reference to FIGS. 9 to 11. For convenience of description, the same components as those in the first embodiment are denoted by the same signs as those in the first embodiment, and description thereof will be omitted.

Figure 9:
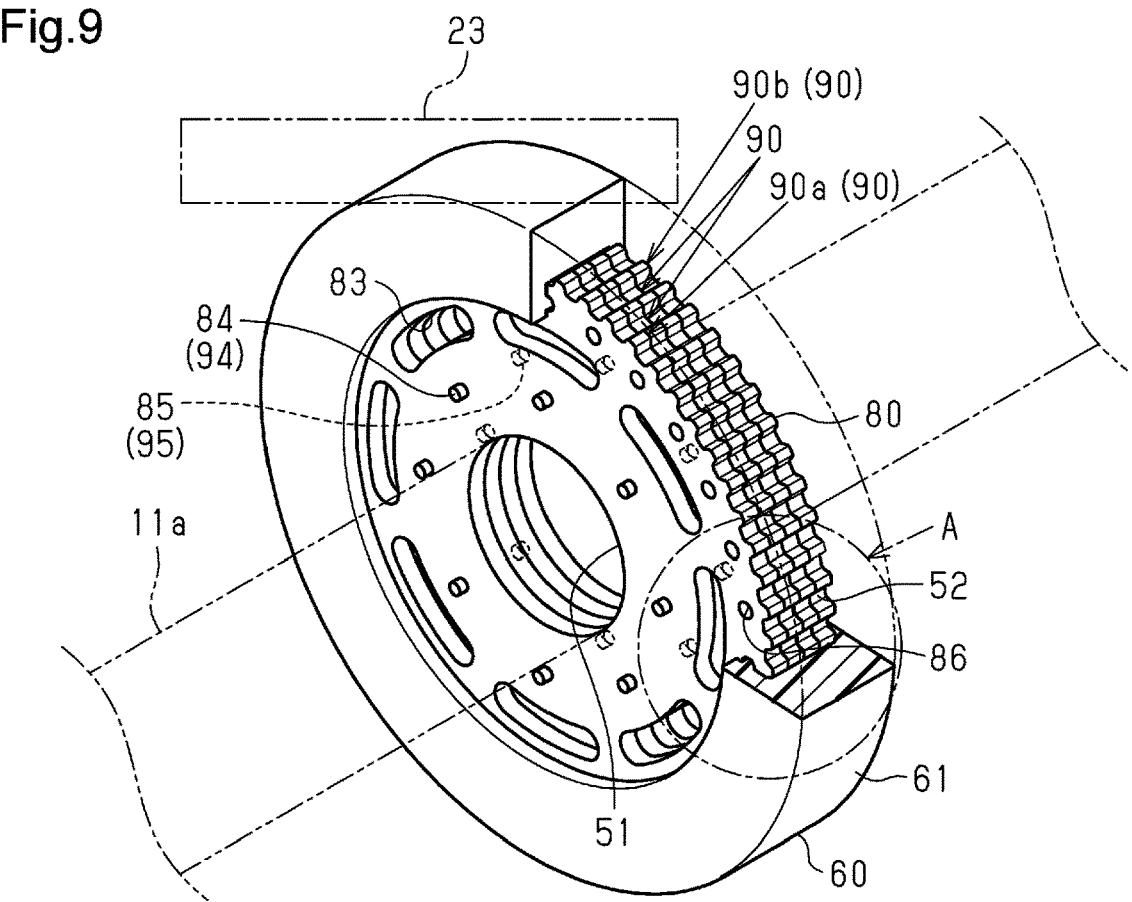
FIG. 9 is a perspective view of a worm wheel according to a second embodiment.

As shown in FIG. 9, a sleeve 80 is a stacked body including a plurality of plates 90 stacked together. There is a difference from the first embodiment in that, while the sleeve 50 of the first embodiment has the lightening holes 53, the protrusions 54, and the recesses 55, the sleeve 80 has lightening holes 83, protrusions 84, recesses 85, and connecting holes 86. There is also a difference from the first embodiment in that, while each plate 70 of the first embodiment has the lightening through holes 73, the plate protrusions 74, and the plate recesses 75, each plate 90 has lightening through holes 93, plate protrusions 94, plate recesses 95, and connecting through holes 96.

<Regarding Lightening Holes>

As shown in FIG. 9, the sleeve 80 has a plurality of lightening holes 83 in its outer peripheral portion. In the present embodiment, the number of lightening holes 83 is eight. The number of lightening holes 83 can be changed as appropriate, as typified by less than eight or nine or more. Each lightening hole 53 axially passes through the sleeve 50. Each lightening hole 83 extends straight in the axial direction of the sleeve 80. The lightening holes 83 are positioned at predetermined intervals, for example, at equal intervals in the circumferential direction of the sleeve 80. A portion of the sleeve 80 where the lightening hole 83 is provided is a portion uncovered with the tooth portion 60. Similarly to the lightening hole 53 of the sleeve 50, the lightening hole 83 is provided for the purpose of reducing the weight of the sleeve 80.

The lightening holes 83 have the same shape. The shape of the lightening hole 83 is a shape of an elongated hole extending in the circumferential direction of the sleeve 80. The shape of the lightening hole 83 can be changed as appropriate as long as all the lightening holes 83 have the same shape.

<Regarding Protrusions and Recesses>

The sleeve 80 has a plurality of protrusions 84 and a plurality of recesses 85 at portions on the radially inner side of the lightening holes 83. The protrusions 84 are provided on a first surface out of the two axial surfaces of the sleeve 80. The recesses 85 are provided on a second surface out of the two axial surfaces of the sleeve 80. In the present embodiment, the number of protrusions 84 is eight on the first surface of the sleeve 80 on the front side of the drawing sheet of FIG. 9. The number of recesses 85 is eight on the second surface of the sleeve 80 on the back side of the drawing sheet of FIG. 9.

The protrusion 84 protrudes in the axial direction from the first surface of the sleeve 80. The shape of the protrusion 84 is columnar. The protruding length of the protrusion 84, that is, the length of the column is smaller than the thickness of one plate 90. Each recess 85 has a depth in the axial direction from the second surface of the sleeve 80. The shape of the recess 85 is circular when viewed in the axial direction of the sleeve 80. The depth of the recess 85 is substantially the same as the protruding length of each protrusion 84. The depth of the recess 85 is smaller than the thickness of one plate 90. The diameter of the protrusion 84 having the circular sectional shape is slightly larger than the diameter of the recess 85 having the circular sectional shape.

The protrusions 84 are positioned at predetermined intervals, for example, at equal intervals in the circumferential direction of the sleeve 80. The recesses 85 are positioned at predetermined intervals, for example, at equal intervals in the circumferential direction of the sleeve 80. The protrusions 84 are provided one by one at positions corresponding to the centers of the lightening holes 83 in the circumferential direction. Similarly, the recesses 85 are provided one by one at positions corresponding to the centers of the lightening holes 83 in the circumferential direction. The portions of the sleeve 80 where the protrusions 84 and the recesses 85 are provided are portions uncovered with the tooth portion 60.

<Regarding Connecting Holes>

The sleeve 80 has a plurality of connecting holes 86 at portions on the radially outer side of the lightening holes 83. In the present embodiment, the number of connecting holes 86 is half the number of grooves 52. The number of connecting holes 86 can be changed as appropriate, as typified by less than half the number of grooves 52. The connecting hole 86 axially passes through the sleeve 80. Each connecting hole 86 extends straight in the axial direction of the sleeve 80. The shape of the connecting hole 86 is circular when viewed in the axial direction of the sleeve 80.

The connecting holes 86 are positioned at predetermined intervals, for example, at equal intervals in the circumferential direction of the sleeve 80. The connecting holes 86 are positioned at an interval that is twice the arrangement interval of the grooves 52. One groove 52 is positioned between two connecting holes 86 adjacent in the circumferential direction. The portion of the sleeve 80 where the connecting hole 86 is provided is a portion covered with the tooth portion 60.

Figure 10:
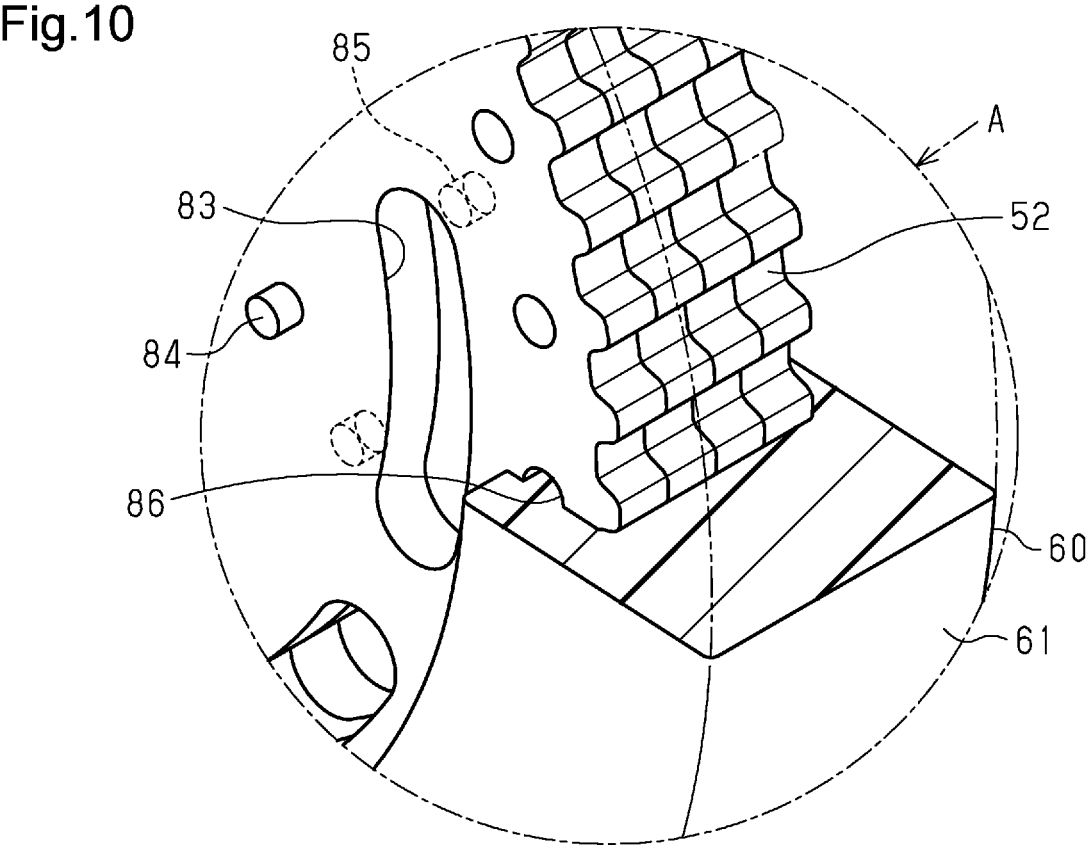
FIG. 10 is an enlarged view of a range A of FIG. 9.

As shown in FIG. 10 enlarging a range A of FIG. 9, the connecting hole 86 connects portions of the tooth portion 60 on both sides in the axial direction. The material of the tooth portion 60 flows into the connecting hole 86 when the tooth portion 60 is formed by injection molding. The material that has flowed into each connecting hole 86 is cured while being connected to the material present on both sides of the sleeve 80 in the axial direction inside each connecting hole 86. That is, the sleeve 80 is coupled to the inner peripheral portion of the tooth portion 60 by the connecting holes 86.

<Regarding Lightening Through Holes>

Figure 11:
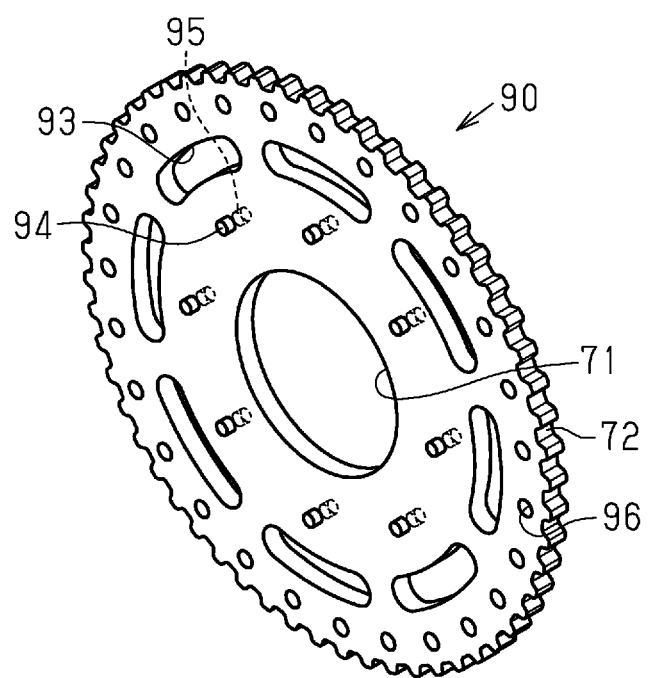
FIG. 11 is a perspective view showing one plate constituting a sleeve of the worm wheel of FIG. 9.

As shown in FIG. 11, the plate 90 has a plurality of lightening through holes 93 in its outer peripheral portion. In the present embodiment, the number of lightening through holes 93 is the same as the number of lightening holes 83 of the sleeve 80. The lightening through hole 93 passes through the plate 90 in the thickness direction. The lightening through holes 93 are positioned at predetermined intervals, for example, at equal intervals in the circumferential direction of the plate 90. A portion of the plate 90 where the lightening through hole 93 is provided is a portion uncovered with the tooth portion 60.

The shapes of the lightening through holes 93 are the same as each other and the same as the shapes of the lightening holes 83. The lightening through hole 93 is formed by punching out a corresponding portion of the steel plate by a process such as pressing when the plate 90 is manufactured. The method for forming the lightening through hole 93 can be changed as appropriate, as typified by forming the lightening through hole 93 by cutting a steel plate that has been punched into an annular shape by a process such as pressing.

<Regarding Plate Protrusions and Plate Recesses>

The plate 90 has a plurality of plate protrusions 94 that are steel plate protrusions and a plurality of plate recesses 95 that are steel plate recesses at portions on the radially inner side of the lightening through holes 93. The plate protrusions 94 are provided on a first surface out of the two axial surfaces of the plate 90. The plate recesses 95 are provided on a second surface out of the two axial surfaces of the plate 90. In the present embodiment, the number of plate protrusions 94 is the same as the number of protrusions 84 on the first surface of the plate 90 on the front side of the drawing sheet of FIG. 11. The number of plate recesses 95 is the same as the number of recesses 85 on the second surface of the plate 90 on the back side of the drawing sheet of FIG. 11.

The plate protrusion 94 protrudes in the axial direction from the first surface of the plate 90. The shape of the plate protrusion 94 is the same as the shape of the protrusion 84. The protruding length of the plate protrusion 74 is smaller than the thickness of one plate 90. The plate recess 95 has a depth in the axial direction from the second surface of the plate 90. The shape of the plate recess 95 is the same as the shape of the recess 85. The depth of the plate recess 95 is smaller than the thickness of one plate 90. The diameter of the plate protrusion 94 having the circular sectional shape is slightly larger than the diameter of the plate recess 95 having the circular sectional shape similarly to the relationship between the protrusion 84 and the recess 85. The plate protrusion 94 of the plate 90 can be press-fitted to the plate recess 95 of another plate 90. The plate protrusion 94 is formed by pushing the corresponding portion of the steel plate into a mold to protrude by a process such as pressing when the plate 90 is manufactured. The plate recess 95 is formed by pushing the mold into the corresponding portion of the steel plate by a process such as pressing when the plate 90 is manufactured.

The plate protrusions 94 are positioned at predetermined intervals, for example, at equal intervals in the circumferential direction of the plate 90. The plate recesses 95 are positioned at predetermined intervals, for example, at equal intervals in the circumferential direction of the plate 90. The plate protrusions 94 are provided one by one at positions corresponding to the centers of the lightening through holes 93 in the circumferential direction. Similarly, the plate recesses 95 are provided one by one at positions corresponding to the centers of the lightening through holes 93 in the circumferential direction. The portions of the plate 90 where the plate protrusions 94 and the plate recesses 95 are provided are portions uncovered with the tooth portion 60.

As shown in FIG. 11, each of the plate protrusions 94 on the first surface of the plate 90 is disposed to overlap one of the plate recesses 95 on the second surface of the plate 90 when viewed in the thickness direction of the plate 90. That is, each of the plate protrusions 94 on the first surface of the plate 90 is disposed to mate with one of the plate recesses 95 on the second surface of the plate 90 in the circumferential and radial directions of the plate 90.

<Regarding Connecting Through Holes>

The plate 90 has a plurality of connecting through holes 96 at portions on the radially outer side of the lightening through holes 93. In the present embodiment, the number of connecting through holes 96 is the same as the number of connecting holes 86 of the sleeve 80. Each connecting through hole 96 passes through the plate 90 in the thickness direction. The shape of each connecting through hole 96 is the same as the shape of each connecting hole 86.

The connecting through holes 96 are positioned at predetermined intervals, for example, at equal intervals in the circumferential direction of the plate 90. The connecting through holes 96 are positioned at an interval that is twice the arrangement interval of the plate grooves 72. One plate groove 72 is positioned between two connecting through holes 96 adjacent in the circumferential direction. The portion of the plate 90 where the connecting through hole 96 is provided is a portion covered with the tooth portion 60. The connecting through hole 96 is formed by punching out a corresponding portion of the steel plate by a process such as pressing when the plate 90 is manufactured. The method for forming the connecting through hole 96 can be changed as appropriate, as typified by forming the connecting through hole 96 by cutting a steel plate that has been punched into an annular shape by a process such as pressing.

<Regarding Stacking of Plates>

A plurality of plates 90 is stacked in the thickness direction with the first surfaces of all the plates 90 oriented in the same direction, that is, with the first surface of each plate 90 facing the second surface of the adjacent plate 90. In the state in which the plurality of plates 90 is stacked, the plate shaft holes 71 are arranged in the thickness direction, the plate grooves 72 are arranged in the thickness direction, and the lightening through holes 93 are arranged in the thickness direction. In the state in which the plurality of plates 90 is stacked, the plate protrusions 94 are arranged in the thickness direction, the plate recesses 95 are arranged in the thickness direction, and the connecting through holes 96 are arranged in the thickness direction. In two adjacent plates 90, each of the plate protrusions 94 of one plate 90 faces one of the plate recesses 95 of the other plate 90 in the thickness direction.

In the two adjacent plates 90, each of the plate protrusions 94 of one plate 90 is fitted, specifically, press-fitted to one of the plate recesses 95 of the other plate 90. The adjacent plates 90 are integrated with each other by fitting the plate protrusions 94 and the plate recesses 95. As a result, the sleeve 80 that is the stacked body in which the plurality of plates 90 is stacked in the thickness direction is completed.

As shown in FIG. 9, the lightening through holes 93 of the plurality of stacked plates 90 form the lightening holes 83 of the sleeve 80 by being arranged in the thickness direction. The plate protrusions 94 and the plate recesses 95 of the adjacent plates 90 that are fitted to each other are embedded inside the sleeve 80 and are not exposed to the outside. As shown in FIG. 9, the plate protrusions 94 and the plate recesses 95 positioned on both the axial surfaces of the sleeve 80 are not fitted to other plate protrusions 94 or plate recesses 95, but form the protrusions 84 and the recesses 85 of the sleeve 80 by being exposed to the outside of the sleeve 80. The plate protrusions 94 that form the protrusions 84 of the sleeve 80 are provided on the first surface of one plate 90a disposed at a first axial end of the sleeve 80. The plate recesses 95 that form the recesses 85 of the sleeve 80 are provided on the second surface of one plate 90b disposed at a second axial end of the sleeve 80.

<Effects of Second Embodiment>

(2-1) The portion of the sleeve 80 where the connecting hole 86 is provided is a portion covered with the tooth portion 60. The connecting hole 86 is coupled to the inner peripheral portion of the tooth portion 60. Relative movement in the circumferential direction between the sleeve 50 and the tooth portion 60 is suppressed by the connecting holes 86. Therefore, the strength of the coupling between the sleeve 50 and the tooth portion 60 can be increased.

(2-2) Relative movement in the circumferential direction between the sleeve 80 and the tooth portion 60 is suppressed by the connecting holes 86. The connecting holes 86 suppress deformation of the tooth portion 60 due to the axial load, that is, so-called excess inclination. The connecting holes 86 have an effect of increasing the strength of the coupling between the sleeve 80 and the tooth portion 60 and an effect of increasing the strength of the tooth portion 60 against the axial load. In this case, the structure of the plate 90 can be simplified compared to a case of individually forming structures having the various effects. This is effective in reducing the capacity of the equipment to be used for the process when manufacturing the plate 90 and in facilitating the processing method.

Third Embodiment

Next, a third embodiment will be described with reference to FIGS. 12 to 14. For convenience of description, the same components as those in the first embodiment are denoted by the same signs as those in the first embodiment, and description thereof will be omitted.

Figure 12:
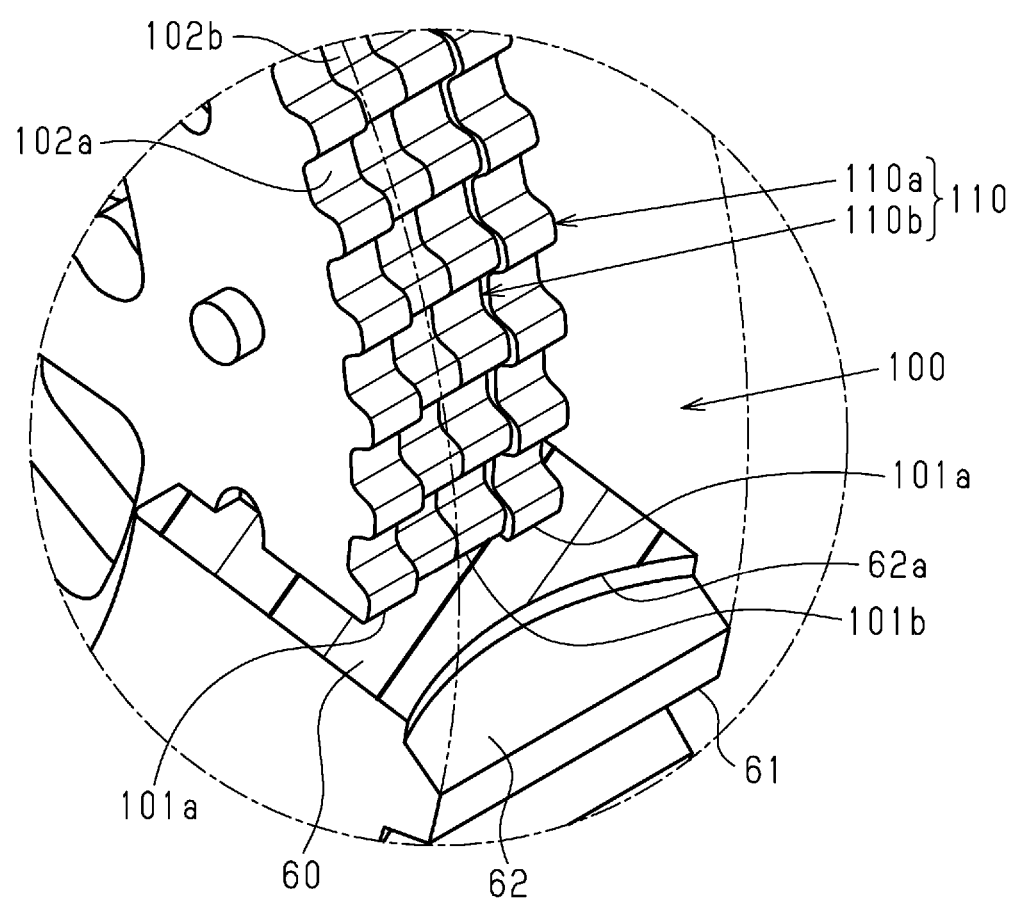
FIG. 12 is an enlarged view of a worm wheel according to a third embodiment.

As shown in FIG. 12, a sleeve 100 is a stacked body including a plurality of plates 110 stacked together. There is a difference from the first embodiment in that, while the sleeve 50 of the first embodiment is the stacked body of the plates 70 having the same outside diameter, the sleeve 100 is a stacked body of two types of plate 110 having different outside diameters. The structure of the sleeve 100 is the same as that of the first embodiment except that it is the stacked body of two types of plate 110 having different outside diameters.

The tooth portion 60 has a plurality of grooves 62 extending in the axial direction of the sleeve 100 on the tooth surfaces 61 that are the outer peripheral surfaces of the tooth portion 60. In the present embodiment, the number of grooves 62 is smaller than, for example, the number of grooves 102a, 102b provided on the outer peripheral surface of the sleeve 100. The number of grooves 62 can be changed as appropriate, as typified by a number equal to or larger than the number of grooves 102a, 102b provided on the outer peripheral surface of the sleeve 100. The groove 62 extends straight in a direction having a slight angle with respect to the axial direction of the sleeve 100. The grooves 62 are positioned at predetermined intervals, for example, at equal intervals in the circumferential direction of the sleeve 100. That is, the plurality of grooves 62 is helical teeth at the tooth surfaces 61. The plurality of grooves 62 can be changed as appropriate, as typified by changing the angle with respect to the axial direction of the sleeve 100. For example, the plurality of grooves 62 may be spur teeth at the tooth surfaces 61. The axial direction of the tooth portion 60 agrees with the axial direction of the sleeve 100. The circumferential direction of the tooth portion 60 agrees with the circumferential direction of the sleeve 100.

The groove 62 has a depth in the radial direction of the sleeve 100. The groove 62 is structured such that its depth increases from both ends toward the center in the axial direction. Both axial ends of a bottom surface 62a of the groove 62 are portions of the bottom surface 62a that are positioned on the radially outermost side. The axial center of the bottom surface 62a is a portion of the bottom surface 62a that is positioned on the radially innermost side. The bottom surface 62a is curved radially inward of the sleeve 100 in an arc between the two axial ends.

<Plate Structure>

In the present embodiment, four plates 110 constituting the sleeve 100 include large-diameter plates 110a and small-diameter plates 110b having different outside diameters. In the present embodiment, the number of large-diameter plates 110a and the number of small-diameter plates 110b are each two. The number of plates 110 can be changed as appropriate, as typified by two large-diameter plates 110a and one or three small-diameter plates 110b, as long as the plates 110 include two or more large-diameter plates 110a and one or more small-diameter plates 110b. The large-diameter plate 110a and the small-diameter plate 110b are manufactured by punching out the steel plate into an annular shape, for example, by a process such as pressing to have corresponding outside diameters. In the present embodiment, the large-diameter plate 110a is an example of a first steel plate. The small-diameter plate 110b is an example of a second steel plate.

Figure 13:
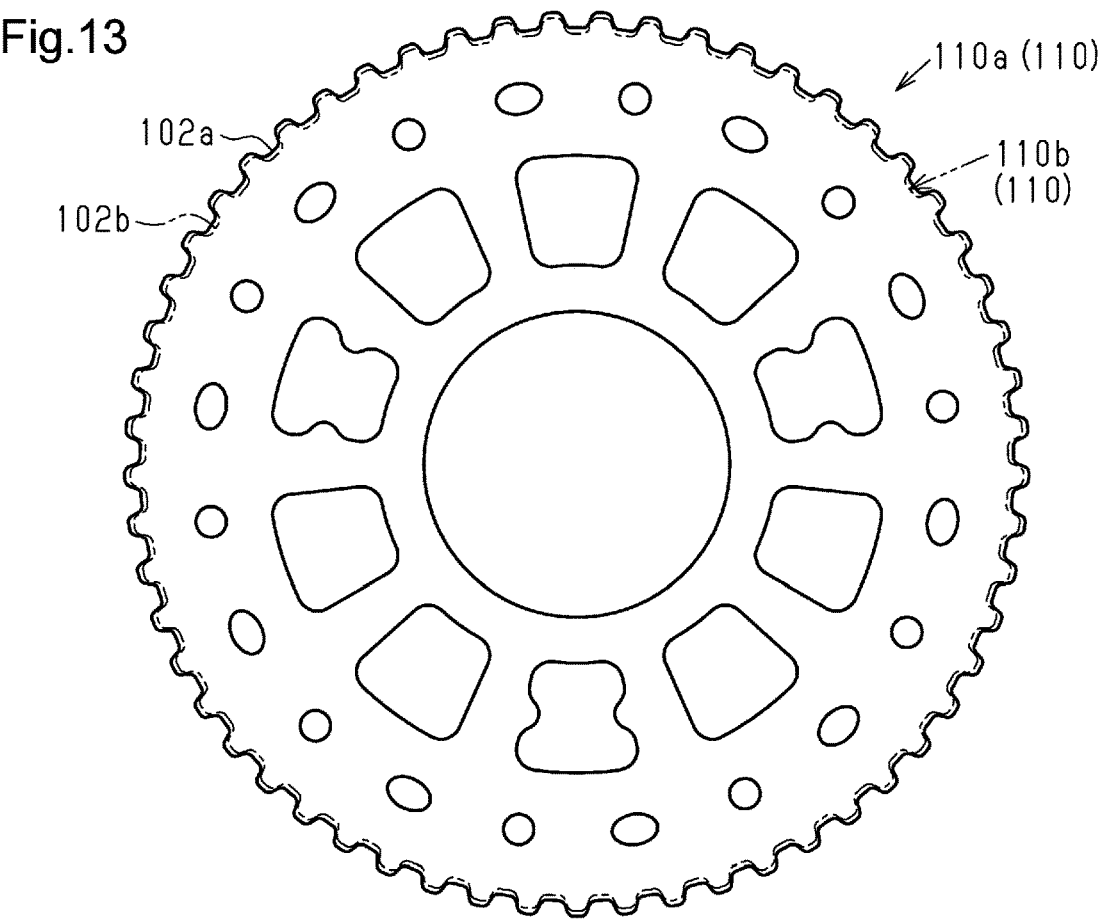
FIG. 13 is a front view showing one plate constituting a sleeve of the worm wheel of FIG. 12.

FIG. 13 shows one large-diameter plate 110a in a continuous line. This figure shows one small-diameter plate 110b in a long dashed short dashed line. The outside diameter of the large-diameter plate 110a is larger than the outside diameter of the small-diameter plate 110b. In the present embodiment, the outside diameter of the small-diameter plate 110b is the same as the outside diameter of the plate 70 of the first embodiment. That is, the outside diameter of the large-diameter plate 110a is larger than the outside diameter of the plate 70 of the first embodiment. The outside diameters of the two large-diameter plates 110a are the same. The outside diameters of the two small-diameter plates 110b are the same.

<Sleeve Structure>

As shown in FIG. 12, the two large-diameter plates 110a and the two small-diameter plates 110b are stacked in the axial direction of the sleeve 100. One large-diameter plate 110a is disposed at each of the two axial ends of the sleeve 100. The two small-diameter plates 110b are disposed between the two large-diameter plates 110a to be sandwiched by them. The sleeve 100 includes two axial end portions 101a positioned on both end sides of the sleeve 100 in the axial direction. The sleeve 100 includes one central portion 101b positioned in a central region of the sleeve 100 in the axial direction. The central portion 101b is positioned between the two axial end portions 101a.

Each axial end portion 101a is a portion corresponding to one large-diameter plate 110a. The axial end portion 101a is provided over the entire circumference of the sleeve 100. The outside diameter of the axial end portion 101a is the outside diameter of the large-diameter plate 110a. The central portion 101b is a portion corresponding to the two small-diameter plates 110b. The central portion 101b is provided over the entire circumference of the sleeve 100. The outside diameter of the central portion 101b is the outside diameter of the small-diameter plate 110b. Therefore, the outside diameter of the axial end portion 101a is larger than the outside diameter of the central portion 101b. The axial end portion 101a protrudes radially outward from the central portion 101b by a difference between the radius of the large-diameter plate 110a and the radius of the small-diameter plate 110b. The outer peripheral surface of the sleeve 100 has a stepped shape, and has a recess that recedes radially inward between the two axial ends of the sleeve 100. In the present embodiment, the axial end portion 101a is an example of a first portion. The central portion 101b is an example of a second portion.

<Regarding Difference Between Outside Diameter of Large-Diameter Plate and Outside Diameter of Small-Diameter Plate>

Figure 14:
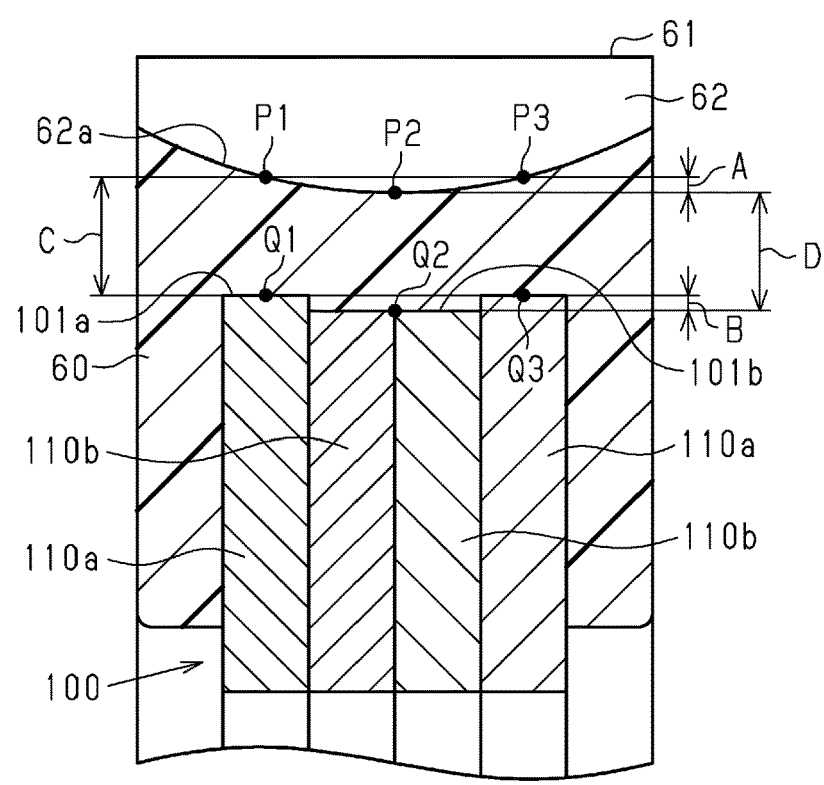
FIG. 14 is a sectional view showing a sectional structure at a position corresponding to the bottom surface of a groove provided in a tooth portion of FIG. 12.

FIG. 14 shows a sectional structure at a position corresponding to the bottom surface 62a of the groove 62 provided in the tooth portion 60 in a state in which a part of the sleeve 100 is covered with the tooth portion 60. FIG. 14 shows three points P1, P2, P3 on the bottom surface 62a of the groove 62. The points P1, P3 are locations corresponding to the axial end portions 101a, and the point P2 is a location corresponding to the central portion 101b. The position on the bottom surface 62a at the point P1 and the position on the bottom surface 62a at the point P2 differ by a difference A in the radial direction of the sleeve 100. In other words, the depth of the groove 62 at the point P1 and the depth of the groove 62 at the point P2 differ by the difference A in the radial direction of the sleeve 100. Similarly, the position on the bottom surface 62a at the point P1 and the position on the bottom surface 62a at the point P3 differ by the difference A in the radial direction of the sleeve 100. In other words, the depth of the groove 62 at the point P1 and the depth of the groove 62 at the point P3 differ by the difference A in the radial direction of the sleeve 100. The depth of the groove 62 at the points P1, P3 is a first depth, and the depth of the groove 62 at the point P2 is a second depth. That is, the groove 62 has the first depth at the locations corresponding to the axial end portions 101a, and has the second depth at the location corresponding to the central portion 101b.

FIG. 14 shows three points Q1, Q2, Q3 on the outer peripheral surface of the sleeve 100. The point Q1 is positioned at the axial center of the axial end portion 101a disposed on one axial end side of the sleeve 100, that is, at the thickness-direction center of the large-diameter plate 110a disposed on one axial end side of the sleeve 100. The points Q1 and P1 are at the same position in the axial direction of the sleeve 100. The point Q2 is positioned at the axial center of the central portion 101b of the sleeve 100, that is, the boundary between the two small-diameter plates 110b. The points Q2 and P2 are at the same position in the axial direction of the sleeve 100. The point Q3 is positioned at the axial center of the axial end portion 101a disposed on the other axial end side of the sleeve 100, that is, at the thickness-direction center of the large-diameter plate 110a disposed on the other axial end side of the sleeve 100. The points Q3 and P3 are at the same position in the axial direction of the sleeve 100. The radius of the axial end portion 101a and the radius of the central portion 101b differ by a difference B. In other words, the radius of the large-diameter plate 110a and the radius of the small-diameter plate 110b differ by the difference B. The difference B related to the radius can be rephrased as a difference (2×B) related to the outside diameter.

In the cross section shown in FIG. 14, the shape of the outer peripheral surface of the sleeve 100 can be approximated to a shape obtained by connecting the three points Q1, Q2, Q3 with a curved line, that is, an arc shape that is curved radially inward of the sleeve 100 between the two axial ends of the sleeve 100. That is, the shape of the outer peripheral surface of the sleeve 100 conforms to the bottom surface 62a of the groove 62 of the tooth portion 60.

The difference B related to the radius of the sleeve 100 is determined based on the difference A related to the depth of the groove 62 of the tooth portion 60. In other words, the difference (2×B) related to the outside diameter of the sleeve 100 is determined based on the difference A related to the depth of the groove 62 of the tooth portion 60. In the present embodiment, the difference B is, for example, the same as the difference A. In FIG. 14, a distance C between the point P1, P3 and the point Q1, Q3 is the same as a distance D between the point P2 and the point Q2. That is, when the difference A and the difference B are the same, the distance C and the distance D are the same. The distance C and the distance D define the thickness of the tooth portion 60 in the radial direction. The thickness of the tooth portion 60 in the radial direction is the same among the portion corresponding to the points P1, Q1, the portion corresponding to the points P2, Q2, and the portion corresponding to the points P3, Q3.

<Effects of Third Embodiment>

(3-1) The outside diameters of the axial end portions 101a positioned at both the end sides of the sleeve 100 in the axial direction are larger than the outside diameter of the central portion 101b positioned in the central region of the sleeve 100 in the axial direction. In the portion of the tooth portion 60 where the sleeve 100 is present, variations in the thickness in the radial direction can be reduced. Therefore, variations in the strength of the tooth portion 60 can be reduced.

(3-2) The axial end portions 101a and the central portion 101b are achieved by processing the large-diameter plates 110a and the small-diameter plates 110b before the stacking. In this case, the capacity of equipment to be used for processing the axial end portions 101a and the central portion 101b can be reduced and the method for processing them can be facilitated compared to a case where the sleeve 100 that is the stacked body is processed.

(3-3) In the manufacture of the large-diameter plate 110a and the small-diameter plate 110b, it is appropriate to manufacture steel plates having two types of outside diameter. In this case, manufacturing labor can be saved compared to a case of manufacturing steel plates having three types of outside diameter.

(3-4) On the outer peripheral surface of the sleeve 100, the shape conforming to the bottom surface 62a of the groove 62 of the tooth portion 60 can be achieved. This is effective in reducing variations in the thickness in the radial direction in the portion of the tooth portion 60 where the sleeve 100 is present.

(3-5) In the portion of the tooth portion 60 where the sleeve 100 is present, a portion capable of reducing variations in the thickness in the radial direction can be provided over the entire circumference. This is effective in reducing variations in the strength of the tooth portion 60.

Other Embodiments

The above embodiments may be modified as follows. The following other embodiments can be combined as long as no technical contradiction arises.

Figure 15:
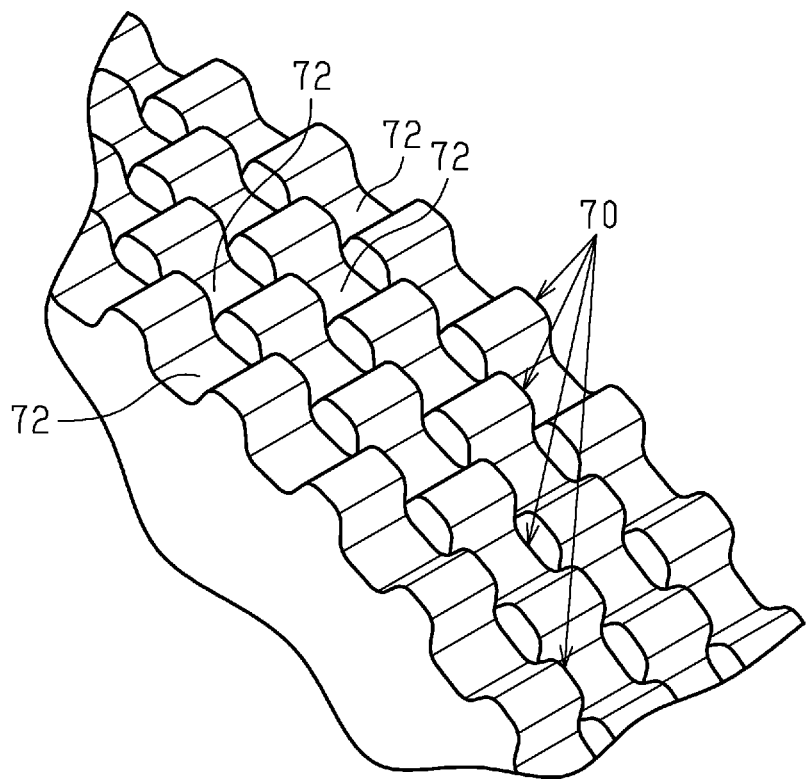
FIG. 15 is a schematic diagram showing a stacked state of plates according to another embodiment.

As shown in FIG. 15, the plurality of plates 70 constituting the sleeve 50 in the first embodiment may be structured such that the plate grooves 72 of adjacent plates 70 are shifted in the circumferential direction. This is effective in further increasing the strength of the coupling between the sleeve 50 and the tooth portion 60. The embodiment of FIG. 15 can similarly be applied to the second embodiment and the third embodiment.

Figure 16:
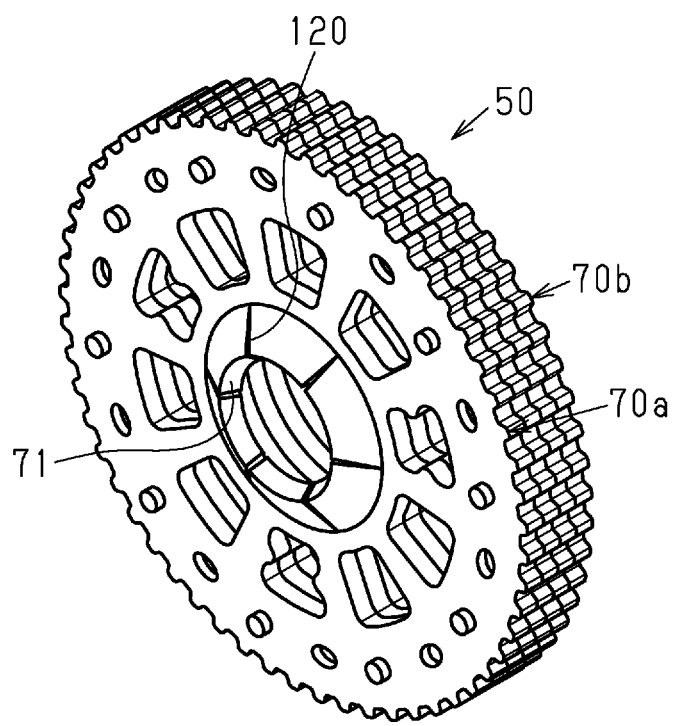
FIG. 16 is a perspective view of a sleeve according to another embodiment.

As shown in FIG. 16, the plate shaft hole 71 of at least one of the two plates 70a, 70b disposed at both the axial ends of the sleeve 50 in the first embodiment may have an inner peripheral edge structured to bite into the outer periphery of the steering shaft 11 inserted into the plate shaft hole 71. In this case, the bore diameter of the plate shaft hole 71 is set smaller than the outside diameter of the steering shaft 11. At least one of the plates 70a, 70b has a plurality of slits 120 extending radially outward from the inner peripheral edge of the plate shaft hole 71. This is effective in further increasing the strength of the coupling between the sleeve 50 and the steering shaft 11. The embodiment of FIG. 16 can similarly be applied to the second embodiment and the third embodiment.

In the first embodiment, the shapes of the protrusion 54 and the recess 55 can be changed as appropriate as long as they can be fitted together. The same applies to the second embodiment and the third embodiment.

In the first embodiment, the method for integrating the plurality of plates 70 can be changed as appropriate. For example, the plurality of plates 70 may be integrated by welding such as laser welding or spot welding, or by bonding using an adhesive or the like. The plurality of plates 70 may be integrated by separate members such as bolts or pins that are inserted across the plurality of plates 70 in a stacked state. When the separate members are pins, the tips of the pins can also be clinched. The plate protrusions 74 and the plate recesses 75 may be omitted when the other embodiment described in this section is employed. That is, the protrusions 54 and the recesses 55 may be omitted. The other embodiment described in this section can similarly be applied to the second embodiment. In this case, the plate protrusions 94 and the plate recesses 95 may be omitted. That is, the protrusions 84 and the recesses 85 may be omitted. The same applies to the third embodiment.

In the first embodiment, the structure for suppressing the relative movement in the circumferential direction between the sleeve 50 and the tooth portion 60 may include at least one of 1) the grooves 52 and 2) the combination of the protrusions 54 and the recesses 55. For example, the grooves 52 may be omitted when the protrusions 54 and the recesses 55 are employed. In this case, the protrusions 54 and the recesses 55 correspond to a connecting portion. The plate protrusions 74 and the plate recesses 75 correspond to a connection formation portion. The same applies to the second embodiment. That is, the structure for suppressing the relative movement in the circumferential direction between the sleeve 80 and the tooth portion 60 may include at least one of the grooves 52 and the connecting holes 86. For example, the grooves 52 may be omitted when the connecting holes 86 are employed. In this case, the connecting holes 86 correspond to the connecting portion. The connecting through holes 96 correspond to the connection formation portion. The same applies to the third embodiment.

In the first embodiment, the lightening holes 53 may be provided in a portion of the sleeve 50 covered with the tooth portion 60. Even in this case, the weight reduction of the sleeve 50 can be achieved. The other embodiment described in this section can similarly be applied to the second embodiment and the third embodiment.

In the first embodiment, all the lightening holes 53 may have the same shape as in the second embodiment. All the lightening through holes 73 may have the same shape. In the second embodiment, the lightening holes 83 may include lightening holes having different shapes as in the first embodiment. The lightening through holes 93 may include lightening through holes having different shapes. The same applies to the third embodiment.

In the first embodiment, the recess 55 may have a circular sectional shape as in the second embodiment. The plate recess 75 may have a circular sectional shape. In the second embodiment, the recess 85 may have an elliptical sectional shape as in the first embodiment. The plate recess 95 may have an elliptical sectional shape. The same applies to the third embodiment.

In the third embodiment, the small-diameter plate 110b may include a large-diameter portion positioned on one side in the axial direction and a small-diameter portion positioned on the other side in the axial direction. The outside diameter of the small-diameter portion is smaller than the outside diameter of the large-diameter portion. The outside diameter of the large-diameter portion may be, for example, the same as that of the large-diameter plate 110a. In the state in which the four plates 110 are stacked, the two small-diameter plates 110b may be disposed such that the small-diameter portions face each other. The outside diameter of the large-diameter portion may be smaller than that of the large-diameter plate 110a. In this case, the outside diameter of the outer peripheral surface of the sleeve 100 changes in a plurality of steps between the two axial ends of the sleeve 100.

In the third embodiment, the large-diameter plate 110a may include a large-diameter portion positioned on one side in the axial direction and a small-diameter portion positioned on the other side in the axial direction. The outside diameter of the small-diameter portion is smaller than the outside diameter of the large-diameter portion. The outside diameter of the small-diameter portion may be, for example, the same as or larger than that of the small-diameter plate 110b. In the state in which the four plates 110 are stacked, the two large-diameter plates 110a may be disposed such that the small-diameter portions face the small-diameter plates 110b. When the outside diameter of the small-diameter portion is larger than that of the small-diameter plate 110b, the outside diameter of the outer peripheral surface of the sleeve 100 changes in a plurality of steps between the two axial ends of the sleeve 100.

In the third embodiment, when the sleeve 100 includes five or more stacked plates 110, the sleeve 100 may be a stacked body of three or more types of plate 110 having different outside diameters. For example, when five plates 110 are included, one plate having the largest outside diameter may be disposed at each of the two axial ends of the sleeve 100. Plates having the second largest outside diameter may be disposed between the two plates having the largest outside diameter. One plate having the smallest outside diameter may be disposed between the plates having the second largest outside diameter. In this case, the outside diameter of the outer peripheral surface of the sleeve 100 changes in a plurality of steps between the two axial ends of the sleeve 100. In the other embodiment described in this section, the central portion 101b is a portion corresponding to the one plate having the smallest outside diameter. That is, the outside diameter of the central portion 101b is the outside diameter of the one plate having the smallest outside diameter.

In the third embodiment, the axial end portion 101a may be provided discontinuously in the circumferential direction of the sleeve 100. The central portion 101b may be provided discontinuously in the circumferential direction of the sleeve 100. In this case, portions of the sleeve 100 where the axial end portion 101*a* and the central portion 101*b* are not provided have the same outside diameter in the axial direction of the sleeve 100.

In the third embodiment, the shape of the tip of the tooth surface 61 of the tooth portion 60 may be an arc shape similar to the bottom surface 62*a* of the groove 62 or may be a planar shape. The tooth portion 60 of the first and second embodiments may have the grooves 62 similar to those of the third embodiment, or the tooth surfaces 61 of the other embodiment described in this section.

Figure 17:
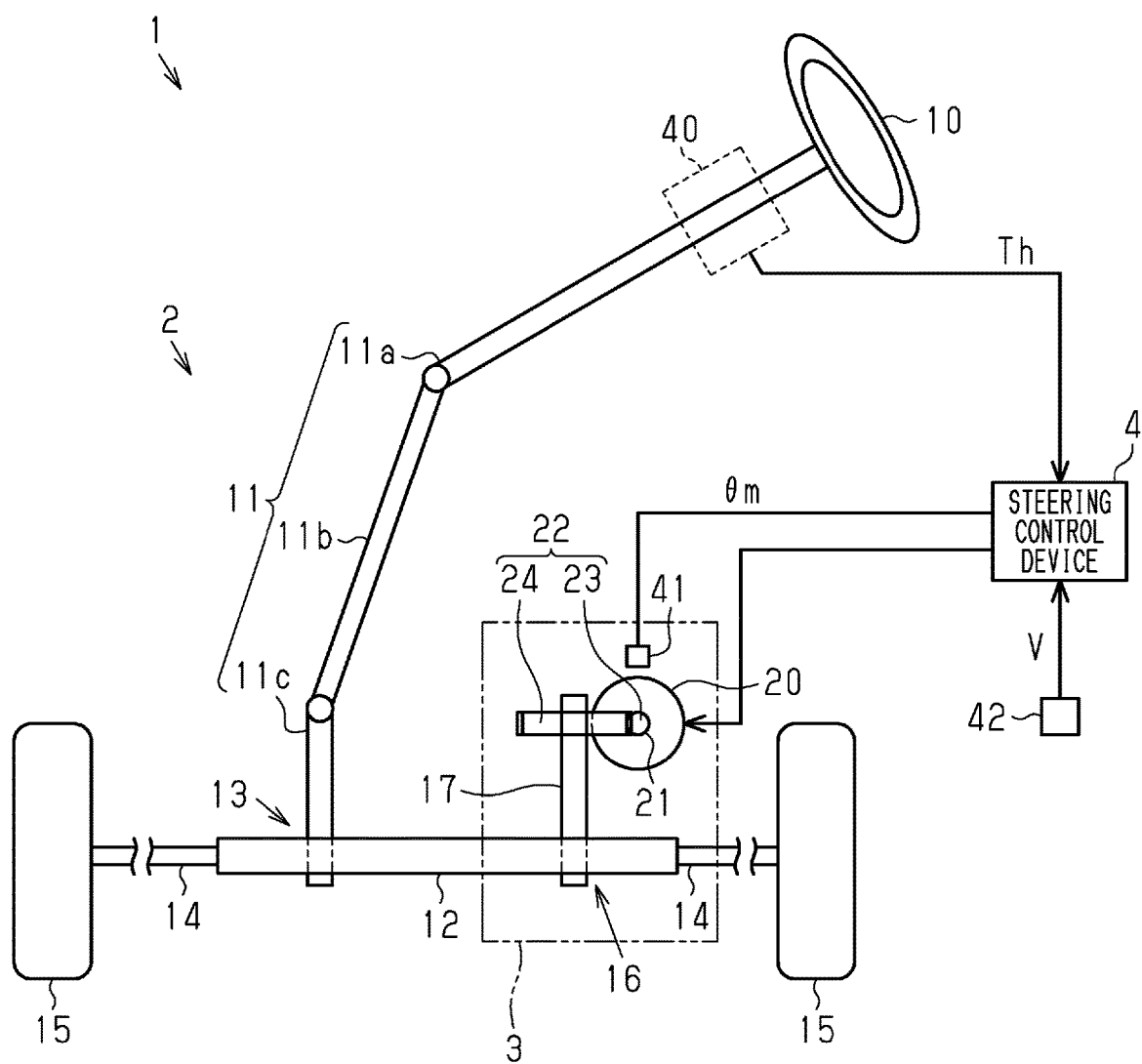
FIG. 17 is a schematic diagram of a steering device according to another embodiment.

As shown in FIG. 17, in each of the above embodiments, the actuator 3 of the steering device 1 may be configured to transmit the motor torque of the motor 20 to the rack shaft 12. The motor 20 is connected to a pinion shaft 17 via the speed reducing mechanism 22. The pinion shaft 17 is connected to the rack shaft 12 via a rack and pinion mechanism 16.

In each of the above embodiments, the steering device 1 may be a steer-by-wire steering device in which a power transmission path between the steering wheel 10 and the steered wheels 15 is mechanically separated. In this case, the motor torque of the actuator 3 may be used as at least one of a reaction force applied to the steering wheel 10 and a turning force for turning the steered wheels 15. Alternatively, the steering device 1 may be a rear-wheel steering device that turns right and left rear wheels of the vehicle. In this case, the motor torque of the actuator 3 may be used as a turning force for turning the right and left rear wheels.

The invention claimed is:

1. A gear comprising:

an annular sleeve; and an annular tooth portion provided by injection molding to cover a part of the sleeve, wherein the sleeve is a stacked body including a plurality of annular steel plates stacked in an axial direction of the sleeve, the sleeve has a plurality of lightening holes passing through the sleeve in the axial direction, the plurality of lightening holes includes a first lightening hole and a second lightening hole having different shapes when viewed in the axial direction, the plurality of lightening holes is disposed in a circumferential direction of the sleeve to be in different states at any phase positions during one rotation of the sleeve, each of the plurality of steel plates has a plurality of lightening through holes passing through the steel plate in the axial direction, the plurality of lightening through holes includes a first lightening through hole and a second lightening through hole having different shapes when viewed in the axial direction, the plurality of lightening through holes is disposed in the circumferential direction of the sleeve to be in different states at any phase positions during the one rotation of the sleeve, the plurality of lightening through holes forms the plurality of lightening holes in a state in which the plurality of steel plates is stacked, each of the plurality of steel plates includes a steel plate protrusion that protrudes in the axial direction and a steel plate recess having a depth in the axial direction, each of the plurality of steel plates is structured such that the steel plate protrusion and the steel plate recess of the steel plates adjacent to each other are fitted together in the state in which the plurality of steel plates is stacked, the steel plate protrusion and the steel plate recess are provided in portions of each of the steel plates covered with the tooth portion, and the same numbers of the steel plate protrusions and the steel plate recesses are alternately disposed in the circumferential direction of the sleeve.

2. The gear according to claim 1, wherein:

the sleeve includes a coupling portion in a portion covered with the tooth portion, and the coupling portion is coupled to the tooth portion to suppress movement of the sleeve in the circumferential direction relative to the tooth portion; and each of the plurality of steel plates includes a coupling formation portion, and the coupling formation portion forms the coupling portion in the state in which the plurality of steel plates is stacked.

3. The gear according to claim 2, wherein:

the coupling portion includes a plurality of grooves extending in the axial direction on an outer peripheral surface of the sleeve;

the plurality of grooves is positioned at predetermined intervals in the circumferential direction; and the coupling formation portion of each of the steel plates includes a plurality of steel plate grooves, and the plurality of steel plate grooves forms the plurality of grooves in the state in which the plurality of steel plates is stacked.

4. The gear according to claim 1, wherein:

the plurality of lightening holes is positioned at predetermined intervals in the circumferential direction of the sleeve; and the plurality of lightening through holes is positioned at predetermined intervals in the circumferential direction.

5. A steering device comprising:

a steering shaft to which a steering wheel of a vehicle is connected;

a steering operation shaft configured to operate to turn a steered wheel of the vehicle;

a motor; and a speed reducing mechanism including the gear according to claim 1, wherein the speed reducing mechanism connects the motor to the steering shaft or the steering operation shaft.

6. A gear comprising:

an annular sleeve; and an annular tooth portion provided by injection molding to cover a part of the sleeve, wherein the sleeve is a stacked body including a plurality of annular steel plates stacked in an axial direction of the sleeve, the sleeve has a plurality of lightening holes passing through the sleeve in the axial direction, the plurality of lightening holes includes a first lightening hole and a second lightening hole having different shapes when viewed in the axial direction, the plurality of lightening holes is disposed in a circumferential direction of the sleeve to be in different states at any phase positions during one rotation of the sleeve, each of the plurality of steel plates has a plurality of lightening through holes passing through the steel plate in the axial direction, the plurality of lightening through holes includes a first lightening through hole and a second lightening through hole having different shapes when viewed in the axial direction, the plurality of lightening through holes is disposed in the circumferential direction of the sleeve to be in different states at any phase positions during the one rotation of the sleeve, the plurality of lightening through holes forms the plurality of lightening holes in a state in which the plurality of steel plates is stacked, each of the plurality of steel plates includes a steel plate protrusion that protrudes in the axial direction and a steel plate recess having a depth in the axial direction, each of the plurality of steel plates is structured such that the steel plate protrusion and the steel plate recess of the steel plates adjacent to each other are fitted together in the state in which the plurality of steel plates is stacked, the steel plate protrusion and the steel plate recess are provided in portions of each of the steel plates uncovered with the tooth portion, the sleeve has, in a portion covered with the tooth portion, a connecting hole passing through the sleeve in the axial direction to connect portions of the tooth portion on both sides in the axial direction, and each of the plurality of steel plates has a connecting through hole passing through the steel plate in the axial direction, and the connecting through hole forms the connecting hole in the state in which the plurality of steel plates is stacked.

7. The gear according to claim 6, wherein:
the sleeve includes a coupling portion in a portion covered with the tooth portion, and the coupling portion is coupled to the tooth portion to suppress movement of the sleeve in the circumferential direction relative to the tooth portion; and each of the plurality of steel plates includes a coupling formation portion, and the coupling formation portion forms the coupling portion in the state in which the plurality of steel plates is stacked.

8. The gear according to claim 7, wherein:
the coupling portion includes a plurality of grooves extending in the axial direction on an outer peripheral surface of the sleeve;

the plurality of grooves is positioned at predetermined intervals in the circumferential direction; and the coupling formation portion of each of the steel plates includes a plurality of steel plate grooves, and the plurality of steel plate grooves forms the plurality of grooves in the state in which the plurality of steel plates is stacked.

9. The gear according to claim 6, wherein:
the plurality of lightening holes is positioned at predetermined intervals in the circumferential direction of the sleeve; and the plurality of lightening through holes is positioned at predetermined intervals in the circumferential direction.

10. A steering device comprising:
a steering shaft to which a steering wheel of a vehicle is connected;

a steering operation shaft configured to operate to turn a steered wheel of the vehicle;

a motor; and a speed reducing mechanism including the gear according to claim 6, wherein the speed reducing mechanism connects the motor to the steering shaft or the steering operation shaft.

11. A gear comprising:
an annular sleeve; and
an annular tooth portion provided by injection molding to cover a part of the sleeve, wherein the sleeve is a stacked body including a plurality of annular steel plates stacked in an axial direction of the sleeve, the sleeve has a plurality of lightening holes passing through the sleeve in the axial direction, the plurality of lightening holes includes a first lightening hole and a second lightening hole having different shapes when viewed in the axial direction, the plurality of lightening holes is disposed in a circumferential direction of the sleeve to be in different states at any phase positions during one rotation of the sleeve, each of the plurality of steel plates has a plurality of lightening through holes passing through the steel plate in the axial direction, the plurality of lightening through holes includes a first lightening through hole and a second lightening through hole having different shapes when viewed in the axial direction, the plurality of lightening through holes is disposed in the circumferential direction of the sleeve to be in different states at any phase positions during the one rotation of the sleeve, the plurality of lightening through holes forms the plurality of lightening holes in a state in which the plurality of steel plates is stacked, the tooth portion includes a plurality of grooves extending in the axial direction on an outer peripheral surface of the tooth portion, the plurality of grooves has a depth in a radial direction of the sleeve, the plurality of grooves is structured such that the depth increases from both ends toward a center in the axial direction, the sleeve includes first portions positioned on both end sides in the axial direction and a second portion positioned in a central region in the axial direction, an outside diameter of each of the first portions is larger than an outside diameter of the second portion, the plurality of steel plates includes two first steel plates disposed at both ends in the axial direction and one or more second steel plates disposed between the two first steel plates, the two first steel plates include the first portions and the one or more second steel plates include the second portion, the number of the second steel plates is two or more, outside diameters of both of the two first steel plates are the same, and outside diameters of all of the two or more second steel plates are the same, and the outside diameters of the two first steel plates are larger than the outside diameters of the two or more second steel plates.

12. The gear according to claim 11, wherein:
each of the grooves has a first depth at a location corresponding to each of the first portions and a second depth at a location corresponding to the second portion; and a difference between the outside diameter of each of the first portions and the outside diameter of the second portion is determined based on a difference between the first depth and the second depth.

13. The gear according to claim 11, wherein the first portions and the second portion are provided over an entire circumference of the sleeve.

14. A steering device comprising:
- a steering shaft to which a steering wheel of a vehicle is connected;
- a steering operation shaft configured to operate to turn a steered wheel of the vehicle;
- a motor; and
- a speed reducing mechanism including the gear according to claim 11, wherein the speed reducing mechanism connects the motor to the steering shaft or the steering operation shaft.

* * * * *

UNITED STATES PATENT AND TRADEMARK OFFICE
CERTIFICATE OF CORRECTION

PATENT NO. : 12,331,821 B2  
APPLICATION NO. : 18/569517  
DATED : June 17, 2025  
INVENTOR(S) : Naofumi Kawamura et al.

Page 1 of 1

It is certified that error appears in the above-identified patent and that said Letters Patent is hereby corrected as shown below:

On the Title Page

Item (71), Line 2, remove "JTEKT COLUMN SYSTEMS CORPORATION, Kosai (JP)".

Signed and Sealed this  
Fifth Day of August, 2025

Coke Morgan Stewart  
*Acting Director of the United States Patent and Trademark Office*